(12) United States Patent
Hii et al.

(10) Patent No.: US 12,637,370 B2
(45) Date of Patent: May 26, 2026

(54) ELECTROCHEMICAL CELL

(71) Applicant: Imperial College Innovations Limited, London (GB)

(72) Inventors: King Kuok Hii, London (GB); Klaus Hellgardt, London (GB)

(73) Assignee: Imperial College Innovations Limited, London (GB)

( * ) Notice: Subject to any disclaimer, the term of this patent is extended or adjusted under 35 U.S.C. 154(b) by 719 days.

(21) Appl. No.: 16/627,088

(22) PCT Filed: Jul. 3, 2018

(86) PCT No.: PCT/GB2018/051868
§ 371 (c)(1),
(2) Date: Dec. 27, 2019

(87) PCT Pub. No.: WO2019/008344
PCT Pub. Date: Jan. 10, 2019

(65) Prior Publication Data
US 2020/0140295 A1 May 7, 2020

(30) Foreign Application Priority Data

Jul. 3, 2017 (GB) ..................................... 1710655

(51) Int. Cl.
*C02F 1/467* (2023.01)
*A46B 9/04* (2006.01)
(Continued)

(52) U.S. Cl.
CPC .............. *C02F 1/4674* (2013.01); *A46B 9/04* (2013.01); *A46B 11/001* (2013.01);
(Continued)

(58) Field of Classification Search
CPC ........ C02F 1/4674; C02F 2001/469157; C02F 2001/46161; C02F 1/46109;
(Continued)

(56) References Cited

U.S. PATENT DOCUMENTS 3,616,442 A * 10/1971 Cheng ....................... C25B 1/30
204/263
4,172,773 A * 10/1979 Pellegri ............... C02F 1/46109
205/758
(Continued)

FOREIGN PATENT DOCUMENTS

EP 2277833 A2 1/2011
JP H10216726 A 8/1998
(Continued)

OTHER PUBLICATIONS

Middelstädt et al. "Numerical investigations on fluid flow through metal screens", (2014), 5th European Conference for Aeronautics and Space Sciences (EUCASS), p. 1-15, [retrieved Dec. 6, 2022 from < https://elib.dlr.de/87260/1/p308.pdf >]. (Year: 2014).*

(Continued)

*Primary Examiner* — Luan V Van
*Assistant Examiner* — Andrew Koltonow
(74) *Attorney, Agent, or Firm* — Linda B. Huber; Nixon Peabody LLP

(57) ABSTRACT
An oxidant production apparatus comprises an electrochemical reactant reservoir, an electrolysis compartment, a porous first electrode and a second electrode. The porous first electrode defines a boundary between the reservoir and the electrolysis compartment and is configured to allow an electrochemical reactant to pass from the reservoir, through the first electrode and into the electrolysis compartment. The second electrode disposed at least substantially in the electrolysis compartment and spaced apart from the first elec-
(Continued)

trode. The apparatus is configured to produce an oxidant in an electrochemical reaction when a voltage is applied across the first and second electrodes and a current is passed through the first and second electrodes and an electrolyte disposed in the electrolysis compartment.

6 Claims, 11 Drawing Sheets

(51) Int. Cl.

| | |
|---|---|
| *A46B 11/00* | (2006.01) |
| *A46B 17/06* | (2006.01) |
| *A47L 15/00* | (2006.01) |
| *A47L 15/42* | (2006.01) |
| *B63B 59/06* | (2006.01) |
| *C02F 1/461* | (2023.01) |
| *D06F 34/14* | (2020.01) |
| *D06F 39/02* | (2006.01) |
| *E03D 9/03* | (2006.01) |
| *C02F 103/42* | (2006.01) |
| *D06F 105/42* | (2020.01) |

(52) U.S. Cl.
CPC ........ *A46B 17/065* (2013.01); *A47L 15/0055* (2013.01); *A47L 15/4238* (2013.01); *B63B 59/06* (2013.01); *C02F 1/46109* (2013.01); *C02F 1/4618* (2013.01); *C02F 1/4672* (2013.01); *D06F 34/14* (2020.02); *D06F 39/022* (2013.01); *E03D 9/038* (2013.01); *A46B 2200/1066* (2013.01); *A47L 2601/06* (2013.01); *C02F 2001/46157* (2013.01); *C02F 2001/46185* (2013.01); *C02F 2103/42* (2013.01); *C02F 2201/46125* (2013.01); *C02F 2201/4618* (2013.01); *C02F 2209/05* (2013.01); *D06F 2105/42* (2020.02)

(58) Field of Classification Search
CPC ............ C02F 2001/46185; C02F 2201/46125; C02F 2201/4618; C02F 1/4618; A47L 15/4238; A47L 15/0055; A47L 2601/06; A46B 16/065; A46B 9/04; A46B 11/001; A46B 11/0068; D06F 39/022; D06F 2105/42; D06F 34/14; B63B 59/06; E03D 9/038
See application file for complete search history.

(56) References Cited

U.S. PATENT DOCUMENTS

| | | | | |
|---|---|---|---|---|
| 4,319,973 | A * | 3/1982 | Porta | D06F 35/003 8/111 |
| 4,319,979 | A | 3/1982 | King | |
| 4,439,295 | A * | 3/1984 | Richards | C02F 1/4674 204/266 |
| 4,620,902 | A * | 11/1986 | Tetzlaff | C25B 15/08 204/263 |
| 5,053,114 | A * | 10/1991 | Maddock | C02F 1/4674 204/266 |
| 5,256,268 | A | 10/1993 | Goti et al. | |
| 6,187,154 | B1 * | 2/2001 | Yamaguchi | C02F 1/008 204/230.6 |
| 6,551,474 | B1 * | 4/2003 | Andrews | C01B 13/10 204/266 |
| 7,048,842 | B2 * | 5/2006 | Tremblay | C02F 1/46104 205/556 |
| 2003/0042134 | A1 | 3/2003 | Tremblay et al. | |
| 2006/0249400 | A1 | 11/2006 | Bremauer | |
| 2009/0026088 | A1 | 1/2009 | Sumida et al. | |
| 2010/0116681 | A1 * | 5/2010 | Routh | C02F 1/4674 205/351 |
| 2012/0012466 | A1 * | 1/2012 | Sperry | C02F 1/4674 204/252 |
| 2013/0161202 | A1 * | 6/2013 | Babych | C02F 1/4674 204/240 |
| 2017/0225977 | A1 * | 8/2017 | Cole | C25B 1/26 |
| 2020/0232200 | A1 * | 7/2020 | Garrels | C02F 1/4674 |

FOREIGN PATENT DOCUMENTS

| | | |
|---|---|---|
| JP | 2000093974 A | 4/2000 |
| KR | 20130108906 A | 10/2013 |
| WO | 2019008344 A1 | 1/2019 |

OTHER PUBLICATIONS

Drogui et al., Oxidising and disinfecting by hydrogen peroxide produced in a two-electrode cell, Wat. Res., 2001, vol. 35(13), pp. 3235-3241.

International Search Report and Written Opinion for PCT/GB2018/051868 dated Sep. 11, 2018, 10 pages.

GB1710655.0 Search Report dated Jan. 3, 2018, 5 pages.

* cited by examiner

ELECTROCHEMICAL CELL

CROSS-REFERENCE TO RELATED APPLICATIONS

This application is a National Phase of International Application No. PCT/GB2018/051868, filed Jul. 3, 2018, which designated the U.S. and that International Application was published under PCT Article 21(2) in English. This application also includes a claim of priority under 35 U.S.C. § 119(a) and § 365(b) to British patent application No. 1710655.0, filed Jul. 3, 2017, the entirety of which is hereby incorporated by reference in their entirety.

BACKGROUND OF THE INVENTION

Oxidants may be used in cleaning and/or sterilisation. However, oxidants can be a problem to store, due to safety concerns, storage space and shelf-life considerations. Furthermore, when a user applies oxidants to an appliance to be cleaned and/or sterilised, human error could mean that they apply too little oxidant, resulting in an ineffective clean, or too much oxidant, which could cause problems in downstream drainage systems. Exposure to the oxidant could also potentially harm the user as many oxidants are irritants and/or are corrosive.

FIELD OF INVENTION

The present invention relates to electrochemical cells, and particularly, although not exclusively, to electrochemical cells for producing an oxidant. More specifically, the invention relates to an electrochemical cell comprising a reservoir for storing reactants therein. The invention extends to uses of the cell, appliances and systems comprising the cell, and to methods of producing an oxidant.

BRIEF DESCRIPTION OF THE DRAWINGS

For a better understanding of the invention, and to show how embodiments of the same may be carried into effect, reference will now be made, by way of example, to the accompanying Figures, in which:—

FIG. 4 is a schematic diagram of a still further batch electrochemical cell;

DETAILED DESCRIPTION OF THE INVENTION

Figure 1A:
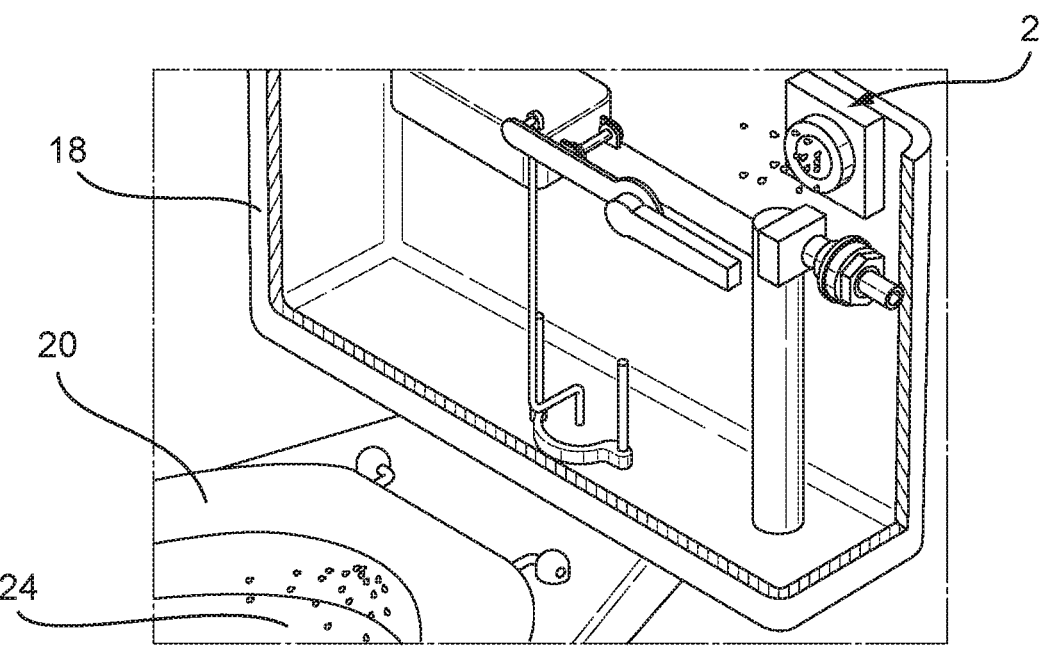
FIG. 1 shows an electrochemical cell located in various domestic appliances.

The present invention arises from the inventors' work in attempting to overcome the problems associated with the prior art.

In accordance with a first aspect of the invention, there is provided an oxidant production apparatus comprising:

an electrochemical reactant reservoir;

an electrolysis compartment;

a porous first electrode defining a boundary between the reservoir and the electrolysis compartment, wherein the first electrode is configured to allow an electrochemical reactant to pass from the reservoir, through the first electrode and into the electrolysis compartment; and a second electrode disposed at least substantially in the electrolysis compartment and spaced apart from the first electrode, wherein the apparatus is configured to produce an oxidant in an electrochemical reaction when a voltage is applied across the first and second electrodes and a current is passed through the first and second electrodes and an electrolyte disposed in the electrolysis compartment.

Advantageously, the apparatus allows an oxidant to be prepared in situ. This means that the oxidant can be prepared immediately prior to use, and there is therefore no need to store the oxidant.

Preferably, the first electrode comprises a mesh, a membrane or a perforated material. Most preferably, the first electrode comprises a mesh. Preferably, the mesh has a pore size of less than 5000 $\mu m$, more preferably less than 1000 $\mu m$, less than 900 $\mu m$, less than 800 $\mu m$, less than 700 $\mu m$ or less than 600 $\mu m$, and most preferably 500 $\mu m$ or less. The mesh may have a pore size of less than 400 $\mu m$, less than 300 $\mu m$, less than 200 $\mu m$ or less than 100 $\mu m$, more preferably less than 75 $\mu m$, less than 50 $\mu m$ or less than 25 $\mu m$, and most preferably less than 20 $\mu m$, less than 15 $\mu m$ or less than 10 $\mu m$. Preferably, the mesh has a pore size of at least 0.01 $\mu m$, more preferably at least 0.1 $\mu m$, at least 0.2 $\mu m$, at least 0.4 $\mu m$, at least 0.6 $\mu m$, at least 0.8 $\mu m$, and most preferably at least 1 $\mu m$. Preferably, the mesh has a pore size of between 0.01 $\mu m$ and 5000 $\mu m$, more preferably between 0.1 $\mu m$ and 1000 $\mu m$, between 0.2 $\mu m$ and 900 $\mu m$, between 0.4 $\mu m$ and 800 $\mu m$, between 0.6 $\mu m$ and 700 $\mu m$ or between 0.8 $\mu m$ and 600 $\mu m$, and most preferably between 1 $\mu m$ and 500 $\mu m$. Preferably, the mesh has a pore size of between 0.01 $\mu m$ and 100 $\mu m$, more preferably between 0.1 $\mu m$ and 75 $\mu m$, between 0.2 $\mu m$ and 50 $\mu m$, between 0.4 $\mu m$ and 25 $\mu m$, between 0.6 $\mu m$ and 20 $\mu m$ or between 0.8 $\mu m$ and 15 $\mu m$, and most preferably between 1 $\mu m$ and 10 $\mu m$. It will be appreciated that a water molecule is about 10 nm, i.e. 0.01 $\mu m$, and so could pass through a mesh with pores of this size. However, while meshes with pore sizes down to 0.01 $\mu m$ could be used in the first aspect, the rate of transfer of the electrochemical reactant from the reservoir to the electrolysis compartment would be slow. Accordingly, in some embodiments, larger pore sizes would be desirable to allow a faster rate of transfer. In other embodiments, a smaller pore size would be desirable to reduce the amount of salt loss.

Preferably, the mesh has an open area of between 20% and 80%.

In an alternative embodiment, the first electrode comprises a sintered metal. The sintered metal may have a mean flow pore (MFP) of between 0.1 μm and 100 μm, more preferably between 1 μm and 80 μm, between 5 μm and 60 μm or between 10 μm and 50 μm, and most preferably between 15 μm and 30 μm or between 17.5 μm and 25 μm. The MFP may be calculated using ASTM F316-03 (reapproved 2011). The MFP may be calculated at 20° C.

Preferably, the first electrode has a thickness of less than 200 mm, more preferably less than 100 mm, less than 50 mm, less than 40 mm, less than 30 mm or less than 20 mm, and most preferably 10 mm or less. Preferably, the first electrode has a thickness of at least 0.01 μm, more preferably at least 0.1 μm, at least 1 μm, at least 10 μm, at least 100 μm, at least 500 μm, and most preferably at least 1 mm. Preferably, the first electrode has a thickness of between 0.01 μm and 20 mm, more preferably between 0.1 μm and 100 mm, between 1 μm and 50 mm, between 10 μm and 40 mm, between 100 μm and 30 mm or between 500 μm and 20 mm, and most preferably between 1 mm and 10 mm.

The first electrode preferably comprises a thickness of at least 0.01 mm, more preferably at least 0.1 mm, at least 0.25 mm, at least 0.5 mm or at least 0.75 mm, and most preferably has a thickness of at least 1 mm, at least 1.1 mm, at least 1.2 mm, at least 1.3 mm, at least 1.4 mm or at least 1.5 mm. The first electrode preferably comprises a thickness of less than 5 mm, more preferably less than 3 mm, less than 2.75 mm, less than 2.5 mm or less than 2.25 mm, and most preferably has a thickness of less than 2.0 mm, less than 1.9 mm, less than 1.8 mm or less than 1.7 mm. The first electrode preferably has a thickness between 0.01 and 5 mm, more preferably between 0.1 and 3 mm, between 0.25 and 2.75 mm, between 0.5 and 2.5 mm or between 0.75 and 2.25 mm, and most preferably has a thickness between 1 and 2 mm, between 1.2 and 1.9 mm, between 1.4 and 1.8 mm or between 1.5 and 1.7 mm. It may be appreciated that the thickness of the electrode defines the minimum distance through the electrode that the electrochemical reactant will need to pass.

The first and second electrodes may comprise any electrically conducting material. Accordingly, the first and second electrodes may each independently comprise a carbon based material, such as graphite or boron-doped diamond (BDD). Alternatively or additionally, the first and second electrodes may each independently comprise a metal, such as steel, copper (Cu), lead (Pb,), Zinc (Zn), Nickel (Ni), Tin (Sn), Magnesium (Mg), brass, platinum (Pt), silver (Ag), gold (Au) or titanium (Ti). Preferably, the steel is stainless steel. The first and second electrodes may comprise different materials. Alternatively, the first and second electrodes may comprise the same material.

It may be appreciated that the choice of electrode may depend upon the type of oxidant which the apparatus is configured to produce. Furthermore, the selection of the electrode material may involve a trade-off between cost and over-potential. For instance, if the apparatus is configured to produce sodium hypochlorite (bleach), the first and second electrodes may comprise stainless steel. Alternatively, if the apparatus is configured to produce persulfate, then the first and second electrodes may comprise lead or boron doped diamond as these electrodes would have a higher over-potential than electrodes comprising steel and so would minimise competitive formation of oxygen leading to a more efficient reaction.

Preferably, the electrolysis compartment is configured to hold a liquid. The liquid may comprise water. The water may comprise a salt. For instance, if the water is sea water it would comprise sodium chloride and potassium chloride. Alternatively, if the water is from a hard water area it may comprise calcium carbonate. Alternatively, or additionally, the liquid may comprise an alcohol, such as ethanol or propanol. This will be particularly advantageous if the apparatus is configured for use in a clinical application. The liquid may comprise a fragrance and/or a dye. The fragrance and/or dye may comprise an ester, an ether and/or an azo dye.

The electrochemical reactant reservoir may be configured to hold a gas, and the boundary between the reservoir and the electrolysis compartment may comprise an interface between the gas and the liquid. In this embodiment, the electrochemical reactant may comprise a gaseous reactant, such as oxygen ($O_2$). The oxygen may be provided as pure oxygen or as a component of air. Accordingly, the oxidant may comprise hydrogen peroxide ($H_2O_2$).

However, in a preferred embodiment, the electrochemical reactant reservoir is configured to hold a liquid. Preferably, the liquid comprises water. Alternatively, or additionally, the liquid may comprise an alcohol, such as ethanol or propanol.

Preferably, the reservoir is configured to allow a user access thereto. Accordingly, the reservoir may define an open top. Accordingly, the reservoir may be open to the environment external to the cell. Alternatively, the reservoir may comprise a removable lid, cover or hatch. Advantageously, a user can add the electrochemical reactant to the electrochemical reactant reservoir. Additionally, a user could also add a fragrance and/or a dye to the reservoir. The fragrance and/or dye may comprise an ester, an ether and/or an azo dye.

The electrochemical reactant may comprise a liquid. Alternatively, the electrochemical reactant may comprise a solid or gas. The gas may comprise oxygen. The electrochemical reactant may be dissolved in a liquid, such as water, when it is added to the reservoir.

However, in a preferred embodiment, the electrochemical reactant reservoir is configured to hold a solid, and preferably also a liquid. Accordingly, the electrochemical reactant may comprise a solid, preferably a solid salt, when it is added to the reservoir.

Advantageously, the solid can be stored easily. If an excess of solid is added to the reservoir a portion of the solid may dissolve in the liquid leading to a saturated solution, and as further liquid is added to the reservoir more of the solid will dissolve. Accordingly, adding the solid to the reservoir once can supply a reactant, which can be used for a number of batches, if the apparatus is being used in a batch process, or for an extended period of time, if the apparatus is being used in a continuous process.

The electrochemical reactant may comprise an inorganic salt, such as a chloride, a sulfate, a carbonate, a phosphate or a hydroxide. The electrochemical reactant may be a sodium salt, a potassium salt or an ammonium salt. Accordingly, the oxidant may comprise a hypochlorite, a persulfate, a percarbonate or a perphosphate. For instance, it may be appreciated that if the electrochemical reactant is a sodium salt it may comprise sodium chloride, sodium sulfate, sodium carbonate, sodium phosphate or sodium hydroxide, and the oxidant may comprise sodium hypochlorite, sodium persulfate, sodium percarbonate or sodium perphosphate.

The oxidant, once produced, may be dissolved in the liquid. Accordingly, the liquid may contain the oxidant. Preferably, the electrolysis compartment comprises an outlet configured to allow the liquid to flow out of the electrolysis compartment.

Advantageously, the oxidant can be removed from the electrolysis compartment with the liquid.

In embodiments where the reservoir defines an open top, the cell may be configured to be positioned, in use, to allow a liquid to flow into the reservoir. For instance, if in use the cell is positioned in a toilet cistern then the top of the reservoir may be positioned below the water fill line of the cistern. Advantageously, water may be introduced into the reservoir when the cistern refills.

Alternatively, the apparatus may comprise an inlet configured to allow the flow of a liquid into the apparatus. The inlet may be configured to cause the liquid to flow directly into the electrolysis compartment. However, in a preferred embodiment, the inlet is configured to cause the liquid to flow directly into the reservoir.

The apparatus may be configured to conduct continuous electrochemical reactions. The outlet may not comprise a valve. Alternatively, the outlet may comprise an outlet valve. The outlet valve may be selected from the group consisting of a flow control valve, a non-return valve, a check valve and a solenoid valve. The inlet may not comprise a valve. Alternatively, the inlet may comprise an inlet valve. The inlet valve may be selected from the group consisting of a flow control valve, a non-return valve, a check valve and a solenoid valve.

The electrochemical reactant reservoir and/or the electrolysis compartment may comprise agitation means configured to agitate a liquid therein. Advantageously, the agitation means will aid the diffusion of the electrochemical reactant into the electrolysis compartment. The agitation means may comprise a stirrer. The stirrer may be a magnetic or mechanical stirrer. Alternatively, the agitation means may comprise a gas inlet disposed towards a base of the electrochemical reactant. Accordingly, the gas inlet may be configured to bubble a gas through a liquid disposed in the electrochemical reactant reservoir, and thereby agitate the liquid.

Alternatively, or additionally, the agitation means may comprise a weir. Preferably, the weir is disposed substantially adjacent to or towards the porous first electrode. The weir may comprise one or more walls disposed in the electrochemical reactant reservoir. Advantageously, the weir will cause a fluid in the reactant reservoir to flow therearound and this will agitate the water and will aid the diffusion of the electrochemical reactant into the electrolysis compartment.

The weir may be viewed as splitting the electrochemical reactant reservoir into two sections, wherein a first section is disposed between the weir and a side of the reaction chamber opposite to the porous first electrode and a second section is disposed between the weir and the porous first electrode.

The weir may comprise a wall extending from a base of electrochemical reactant reservoir and terminating before a top thereof. Preferably, the wall terminates substantially adjacent to or towards the top of the reactant reservoir. Accordingly, a fluid in a first part of the electrochemical reactant reservoir must flow over a top of the wall to reach the second part of the electrochemical reactant reservoir and the porous electrode.

Alternatively, or additionally, the weir may comprise a wall extending from a top of electrochemical reactant reservoir and terminating before a base thereof. Preferably, the wall terminates substantially adjacent to or towards the base of the reactant reservoir. Accordingly, a fluid in a first part of the electrochemical reactant reservoir must flow under a bottom of the wall to reach the second part of the electrochemical reactant reservoir and the porous electrode.

In a preferred embodiment, the weir comprises a first wall extending from a base of electrochemical reactant reservoir and terminating before a top thereof and a second wall extending from the top of electrochemical reactant reservoir and terminating before the base thereof. Preferably, the second wall is disposed between the first wall and the porous first electrode. Preferably, the first wall terminates substantially adjacent to or towards the top of the reactant reservoir. Preferably, the second wall terminates substantially adjacent to or towards the base of the reactant reservoir. Accordingly, a fluid in a first part of the electrochemical reactant reservoir must flow over a top of the first wall and then under a bottom of the second wall to reach the second part of the electrochemical reactant reservoir and the porous electrode.

In a final embodiment, the weir preferably comprises a step weir. Accordingly, the weir may comprises a wall extending from a base of electrochemical reactant reservoir and terminating before a top thereof, wherein the wall comprises a first step disposed adjacent to the porous first electrode, and a second step disposed adjacent to the first step, wherein the second step terminates closer to the top of the reactant reservoir than the second step. The second step preferably terminates substantially adjacent to or towards the top of the reactant reservoir. The first step preferably terminates closer to the top of the reactant reservoir than to the bottom.

In embodiments where the apparatus comprises an inlet configured to allow the flow of a liquid into the apparatus, the inlet is preferably configured to cause the liquid to flow directly into the reservoir. Preferably, the inlet is configured to inject a liquid into the reaction reservoir substantially adjacent to or towards a base of the reaction reservoir. Preferably, the inlet is configured to inject a liquid into the reaction reservoir substantially adjacent to or towards a side of the reaction chamber opposite to the porous first electrode. Advantageously, the inlet can work in conjunction with the weir to agitate the fluid in the reservoir.

The apparatus may be configured to conduct batch or semi-batch electrochemical reactions. Accordingly, the outlet may comprise an outlet valve, which is preferably a non-return valve, a check valve or a solenoid valve. The inlet may comprise an inlet valve, which is preferably a non-return valve, a check valve or a solenoid valve.

In each case the non-return valve or the check valve may comprise a ball check valve, a diaphragm check valve, a swing check valve, a stop-check valve, a lift-check valve, an in-line check valve, a duckbill valve or a pneumatic non-return valve. Preferably, the non-return valve or the check valve is configured to allow a fluid to flow therethrough when pressure on the upstream side is greater than pressure on the downstream side, and to prevent a fluid from flowing therethrough when pressure on the upstream side is equal to or less than pressure on the downstream side. Accordingly, the non-return valve or the check valve may be a diaphragm check valve or a duck-bill valve, preferably a diaphragm check valve.

The apparatus may comprise a pump. The pump may be configured to pump liquid out of the outlet. Alternatively, the pump may be configured to pump liquid into the inlet. Accordingly, the delivery of the oxidant may be controlled using the pump.

In one embodiment, the outlet and/or the inlet comprise a solenoid valve. Preferably, both the outlet and the inlet comprise a solenoid valve. Accordingly, the delivery of the oxidant may be controlled by electronically controlling the or each solenoid valve.

In an alternative embodiment, the outlet and/or the inlet comprise a non-return valve or a check valve. Preferably, both the outlet and the inlet comprise a non-return valve or a check valve. Preferably, the non-return valve or the check valve is configured to allow a fluid to flow therethrough when pressure on the upstream side is greater than pressure on the downstream side, and to prevent a fluid from flowing therethrough when pressure on the upstream side is equal to or less than pressure on the downstream side. Accordingly, the delivery of the oxidant may be controlled by controlling the level of a liquid in which the apparatus is disposed.

The apparatus may comprise a vent. The outlet may be configured to allow a gas to vent from the electrolysis compartment. The vent may comprise a vent valve. Preferably, the vent valve is a back-pressure regulating valve. It may be appreciated that hydrogen may be produced as a by-product of the electrolysis reaction where the electrochemical reactant comprises an inorganic salt. Advantageously, the vent prevents the build-up of hydrogen in the electrolysis compartment. Preferably, the vent comprises a catalyst configured to convert the hydrogen into water. The catalyst may comprise palladium and/or platinum. The vent may then be configured to discharge the water to the environment.

The apparatus may comprise a boundary between the reservoir and the porous first electrode, wherein the boundary comprises a reservoir valve. The reservoir valve may be selected from the group consisting of a flow control valve, a non-return valve, a check valve and a solenoid valve. Preferably, the reservoir valve is a solenoid valve. Preferably, the apparatus comprises a liquid inlet configured to allow the flow of a liquid into the reservoir. Preferably, the apparatus comprises a gas inlet configured to allow the flow of a gas into the electrolysis compartment. Preferably, the apparatus comprises a vent configured to allow a gas to vent from the electrolysis compartment. Advantageously, the reservoir valve allows a liquid containing the oxidant to be removed from the electrolysis compartment without liquid containing the electrochemical reactant being removed from the reservoir. Accordingly, the liquid in the reservoir may be isolated, while the liquid in the electrolysis compartment is removed and replaced by a gas. The liquid in the reservoir may then be allowed to flow into the electrolysis compartment, displacing the gas.

The apparatus may comprise a power supply configured to apply a voltage across the first and second electrodes. The power supply could comprise a battery, a generator, a renewable power source or it could comprise the national grid. The renewable power source may comprise a solar power generator or a hydropower generator.

The power supply may be configured to provide a voltage of at least 0.1 V, preferably at least 0.5 V, and most preferably at least 1 V across the first and second electrodes. The power supply may be configured to provide a voltage of less than 300 V, preferably less than 100 V, less than 50 V, less than 25 V or less than 10V, and most preferably less than 7.5 V across the first and second electrodes. The power supply may be configured to provide a voltage of between 0.1 V and 300 V, preferably between 0.5 V and 100 V, between 0.6 V and 50 V, between 0.7 V and 25 V or between 0.8 V and 10 V, and most preferably between 1 V and 5 V across the first and second electrodes.

In some embodiments, the electrolysis compartment may comprise an undivided cell. Accordingly, the electrolysis compartment may not comprise an ion-permeable membrane between the anode and the cathode which divides the electrolysis compartment into an anolyte compartment and a separate catholyte compartment. Advantageously, an apparatus comprising an undivided cell may be used to produce a hypochlorite, preferably sodium hypochlorite.

In alternative embodiments, the electrolysis compartment may comprise a divided cell. Accordingly, the electrolysis compartment may comprise an ion-permeable membrane between the anode and the cathode which divides the electrolysis compartment into an anolyte compartment and a separate catholyte compartment. The ion-permeable membrane may comprise, an ionomer, a cation-exchange material, an anion-exchange material, a bipolar material, a fully or partially perfluorinated ion-exchange material, a fully or partially fluorinated polymeric material containing functional groups, a fully or partially sulfonated tetrafluoroethylene based-copolymer material or mixtures thereof. Preferably, the ion-permeable membrane comprises a fluoropolymer-copolymer membrane, such as Nafion®. Advantageously, an apparatus comprising an divided cell may be used to produce a persulfate, a percarbonate, a perphosphate or hydrogen peroxide.

The first electrode may comprise an anode, and the second electrode may comprise a cathode. Accordingly, the oxidant may be produced at the anode.

Preferably, the first electrode has a substantially planar shape. Preferably, the planar shape defines the boundary between the reservoir and the electrolysis compartment. Preferably, the second electrode has a substantially planar shape. Preferably, the second electrode it disposed parallel to the first electrode. Advantageously, the first and second electrode provide an unrestricted electric field with well distributed current density. Alternatively, the second electrode may comprise a coil shape.

Advantageously, this increases the surface area of the second electrode.

The apparatus preferably comprises a control system. Preferably, the control system is configured to sense the conductivity or resistance between the first and second electrodes. Alternatively or additionally, the control system may be configured to sense the level of the liquid in the electrolysis compartment and/or the reservoir.

In embodiments where the apparatus is configured to conduct batch or semi-batch electrochemical reactions, the control system may be configured to cause the voltage to be applied across the first and second electrodes and the current to flow through the first and second electrodes and an electrolyte disposed in the electrolysis compartment when a desired conductivity or resistance is reached. The desired conductivity may be at least $0.5 \text{ S cm}^2 \text{ mol}^{-1}$, preferably, at least $1 \text{ S cm}^2 \text{ mol}^{-1}$, at least $5 \text{ S cm}^2 \text{ mol}^{-1}$, at least $10 \text{ S cm}^2 \text{ mol}^{-1}$ or at least $15 \text{ S cm}^2 \text{ mol}^{-1}$, and most preferably at least $20 \text{ S cm}^2 \text{ mol}^{-1}$. The desired conductivity may be less than $10,000 \text{ S cm}^2 \text{ mol}^{-1}$, preferably less than $5,000 \text{ S cm}^2 \text{ mol}^{-1}$, less than $2,500 \text{ S cm}^2 \text{ mol}^{-1}$, less than $1,000 \text{ S cm}^2 \text{ mol}^{-1}$ or less than $750 \text{ S cm}^2 \text{ mol}^{-1}$, and most preferably $500 \text{ S cm}^2 \text{ mol}^{-1}$ or less. The desired conductivity may be between $0.5 \text{ S cm}^2 \text{ mol}^{-1}$ and $10,000 \text{ S cm}^2 \text{ mol}^{-1}$, preferably, between $1 \text{ S cm}^2 \text{ mol}^{-1}$ and $5,000 \text{ S cm}^2 \text{ mol}^{-1}$, between $5 \text{ S cm}^2 \text{ mol}^{-1}$ and $2,500 \text{ S cm}^2 \text{ mol}^{-1}$, between $10 \text{ S cm}^2 \text{ mol}^{-1}$ and $1,000 \text{ S cm}^2 \text{ mol}^{-1}$ or between $15 \text{ S cm}^2 \text{ mol}^{-1}$ and $750 \text{ S cm}^2 \text{ mol}^{-1}$, and most preferably between $20 \text{ S cm}^2 \text{ mol}^{-1}$ and $500 \text{ S cm}^2 \text{ mol}^{-1}$. If the control system fails to detect the desired conductivity or resistance within a pre-determined time, the control system may be configured to notify the user. It will be appreciated that the desired conductivity or resistance would not be reached if there is no electrochemical reactant in the reservoir. Accordingly, upon receiving the notification, the user could add more of the electrochemical reactant to the reservoir.

In a preferred embodiment, the control system is configured to activate the power source when a desired conductivity or resistance is reached. Preferably, the control system is configured to deactivate the power source after a predetermined period of time has passed. It may be appreciated that the predetermined period of time will depend on the volume of the electrolytic cell, the voltage applied, the surface area of the first and second electrodes, the current density and the oxidant being produced. Accordingly, the desired time could be between 10 seconds and 24 hours.

After the power source has been deactivated, the control system may be configured to open the outlet valve. It will be appreciated that if the inlet does not comprise a valve or comprises a non-return valve then opening the valve on the outlet may be sufficient to allow the liquid containing the oxidant to flow out of the electrolysis compartment. Alternatively, the power source may also be configured to open the inlet valve. Accordingly, if the inlet comprises a check valve or solenoid valve, then opening both valves may be sufficient for the liquid containing the oxidant to flow out of the electrolysis compartment. Alternatively, the apparatus may comprise a pump. The control system may be configured to activate the pump, and thereby cause the oxidant to flow out of the electrolysis compartment.

The control system may be configured to open the outlet valve and/or the inlet valve a predetermined time after the voltage has been applied. Alternatively, the control system may be configured to send the signal to open the outlet valve and/or the inlet valve when a signal has been received from a user.

After a further predetermined time, the control system may be configured to close the outlet valve. The control system may also be configured to close the inlet valve. The control system may also be configured to deactivate the pump. It may be appreciated that the predetermined time may vary depending upon the volume of the electrolysis compartment and the flow rate of the liquid. Alternatively or additionally, the control system may be configured to close the outlet valve, close the inlet valve and/or deactivate the pump when a signal has been received from a user.

In embodiments where the apparatus is configured to conduct continuous electrochemical reactions, the control system may be configured to vary the voltage applied across the electrolysis compartment as the conductivity or resistance varies. Alternatively, or additionally, the control system may be configured to control the flow of the liquid through the electrolysis compartment. This could be achieved due to a flow control valve disposed on the inlet and/or outlet. Accordingly, the control system may be configured to vary the flow of the liquid through the electrolysis compartment as the conductivity or resistance varies.

If the conductivity falls below a predetermined value, or the resistance rises above a predetermined value, the control system may be configured to notify the user. It will be appreciated that the conductivity may decrease and the resistance may increase if the concentration of the electrochemical reactant decreases due to the supply in the reservoir being depleted. Accordingly, upon receiving the notification, the user could add more of the electrochemical reactant to the reservoir.

The apparatus may be configured for use in a toothbrush, a hand sanitiser, a tap, a toilet cistern, a dish washer, a washing machine, fruit storage, a swimming pool water purification system, soil decontamination, providing a potable water supply, a clinical or hospital environment, a sewer or wastewater treatment plant or an ocean liner.

In accordance with a second aspect, there is provided use of the apparatus of the first aspect to produce an oxidant.

Preferably, the oxidant is for use in a cleaning or sterilising application. For example, a device may be cleaned or sterilised using the oxidant generated by the apparatus of the first aspect. The device may be used in a toothbrush, a hand sanitiser, a tap, a toilet cistern, a dish washer, a washing machine, fruit storage, a swimming pool water purification system, soil decontamination, providing a potable water supply, a clinical or hospital environment, a sewer or wastewater treatment plant or an ocean liner.

In accordance with a third aspect, there is provided a toothbrush, a hand sanitiser, a tap, a toilet cistern, a dish washer, a washing machine, fruit storage, a swimming pool water purification system, soil decontamination, providing a potable water supply, a clinical or hospital environment, a sewer or wastewater treatment plant or an ocean liner comprising the apparatus of the first aspect.

In accordance with a fourth aspect, there is provided a method of producing an oxidant, the method comprising:

charging an electrochemical reactant reservoir with an electrochemical reactant;

passing the electrochemical reactant from the reservoir, through a porous first electrode and into an electrolysis compartment to create an electrolyte; and applying a voltage across first and second spaced apart electrodes and causing a current to flow through the first and second electrodes and the electrolyte, wherein the second electrode is disposed at least substantially in the electrolysis compartment, thereby driving an electrochemical reaction and producing the oxidant.

Preferably, the method of the fourth aspect is conducted using the apparatus of the first aspect.

The method may comprise charging the electrochemical reactant reservoir with a fragrance or a dye. Advantageously, the solution which is produced would have a desired scent or colour.

Preferably, the electrochemical reactant is a solid, and more preferably an inorganic salt. Preferably, the reservoir comprises a liquid, which preferably comprises water and/or an alcohol. Accordingly, the method may comprise dissolving the electrochemical reactant in the liquid.

Passing the electrochemical reactant from the reservoir, through a porous first electrode and into an electrolysis compartment may comprise agitating a liquid in the reservoir and/or in the electrolysis compartment. Advantageously, agitating the liquid will aid diffusion of the electrochemical reactant. Agitating the liquid may comprise stirring the liquid or passing a gas therethrough. In a preferred embodiment, agitating the liquid comprises causing the liquid to flow through a weir.

Preferably, the method comprises removing the oxidant from the electrolysis compartment. Preferably, the electrolysis compartment comprises the liquid. The oxidant which is produced may be dissolved in the liquid. Accordingly, removing the oxidant from the electrolysis compartment may comprise removing the liquid containing the oxidant from the electrolysis compartment. The method may comprise causing the liquid to flow from the electrolysis compartment. The method may comprise causing a further liquid to flow into the electrolysis compartment. Preferably, the further liquid does not comprise the oxidant. Preferably, the further liquid comprises water.

The method may comprise sensing the conductivity or resistance between the first and second electrodes. Alternatively, or additionally, the method may comprise sensing the level of the liquid in the electrolysis compartment and/or in the reservoir.

In one embodiment, the method comprises applying the voltage across the first and second electrodes and causing the current to flow when a desired conductivity or resistance is sensed. The method may comprise applying the voltage for a predetermined time. The method may then comprise causing the liquid to flow from the electrolysis compartment for a predetermined time. The method may also comprise causing the further liquid to flow into the electrolysis compartment for the predetermined time.

In an alternative embodiment, the method comprises applying the voltage across the first and second electrodes and causing the current to flow. The method may comprise simultaneously causing the liquid to flow from the electrolysis compartment. The method may also comprise simultaneously causing the further liquid to flow into the reservoir and/or the electrolysis compartment. The method may comprise varying the rate of flow of the liquid into and/or out of the chamber as variations in the conductivity or resistance are sensed. Alternatively, or additionally, the method may comprise varying the voltage across the first and second electrodes as variations in the conductivity are sensed.

All features described herein (including any accompanying claims, abstract and drawings), and/or all of the steps of any method or process so disclosed, may be combined with any of the above aspects in any combination, except combinations where at least some of such features and/or steps are mutually exclusive.

Example 1—Batch Production of Sodium Hypochlorite (Bleach)

Oxidants are used to clean and sterilise a number of domestic appliances. However, as explained above, there are a number of disadvantages associated with this use.

Accordingly, the inventors have developed an electrochemical cell 2 which may be used in a domestic appliance to produce an oxidant.

For instance, as shown in FIG. 1a, the electrochemical cell 2 may be disposed in the cistern 18 of a toilet 20. As explained below, the electrochemical cell 2 is configured to automatically produce an oxidant. This is released into the cistern 18, and will flow into a toilet bowl 24 when the toilet 20 is flush. Accordingly, the toilet 20 can be cleaned automatically.

Figures 2, 3:
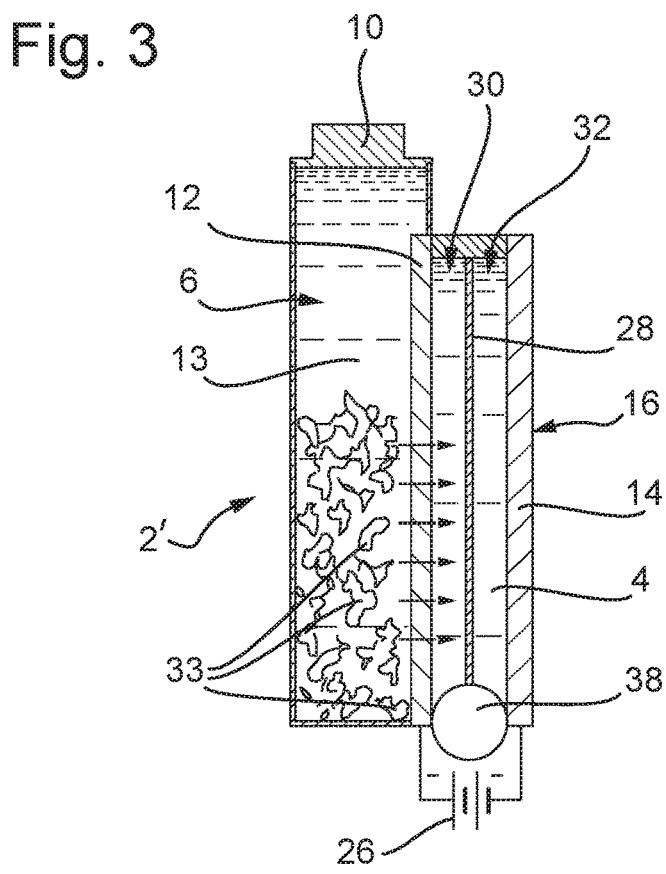
FIG. 2 is a schematic diagram of a batch electrochemical cell.
FIG. 3 is a schematic diagram of a further batch electrochemical cell.

As shown in FIG. 2, an electrochemical cell 2 comprises an electrolysis compartment 4 adjacent to a reservoir 6. Both the electrolysis compartment 4 and the reservoir 6 are substantially cuboid in shape and share a connecting wall.

The walls of the reservoir 6 are predominantly defined by a housing 8 comprising a polymer or a composite. In the embodiment illustrated, the reservoir is open at the top 15. The cell 2 is disposed in the toilet cistern 18 such that the top 15 of the reservoir 6 is slightly below the water fill level 17 of the cistern 18. In some embodiments, a metal housing may be used if the electrodes 12, 14 are isolated. Accordingly, the user can add solid sodium chloride (NaCl) 11 to the reservoir, and it will then dissolve in water ($H_2O$) 13 disposed therein to make a sodium chloride solution. Assuming a user adds excess NaCl 11 to the reservoir 6, the NaCl 11 will dissolve until the solution becomes saturated. A quantity of solid NaCl 11 will then remain in the reservoir.

The walls of the electrolysis compartment 4 are predominantly defined by a further housing 16. However, in the embodiment illustrated, the connecting wall between the reservoir 6 and the electrolysis compartment 4 comprises an anode 12. A cathode 14 is disposed on the opposite side of the electrolysis compartment 4 to the anode 12, adjacent to an external wall of the housing 16.

Both the anode 12 and cathode 14 comprise stainless steel. The cathode 14 comprises a solid plate. However, the anode 12 comprises a mesh with a pore diameter typically between 1 μm and 500 μm and a thickness of about 1 mm. Accordingly, the dissolved NaCl ions will be able to pass through the anode 12 and into the electrolysis compartment 4. The process by which this occurs will be a mixture of convection, diffusion and migration. It will be appreciated that the rate of convection, diffusion and/or migration across the anode 12 will be determined by a number of factors, including pore size and structure in the anode 12, the relative concentration gradient between the reservoir 6 and the electrolysis compartment 4, the thickness of the anode 12 and the hydrophobicity/hydrophilicity of the material comprising the anode 12, for instance see Middelstädt et al., "Numerical Investigations on Fluid Flow through Metal Screens".

A control system (not shown) measures the conductivity of the solution between the anode 12 and cathode 14. It will be appreciated that as the concentration of NaCl ions ('electrolyte') within the electrolysis compartment 4 increases the conductivity will also increase. When a desired conductivity has been reached, the control system will activate a power supply 26 to apply a voltage across the electrolysis compartment 4 and cause a current to flow through the electrodes 12, 14 and the sodium chloride solution, and to thereby initiate an electrochemical reaction.

Accordingly, this will cause the following reaction at the cathode:

$$2H_2O+2e^-\rightarrow 2OH^-+H_2$$

And, the following reaction at the anode:

$$2Cl^-\rightarrow Cl_2+2e^-$$

The chlorine ($Cl_2$) produced at the anode will dissolve in the water ($H_2O$) and react like SO:

$$Cl_2+H_2O\rightarrow HOCl+H^++Cl^-$$

Finally, the hypochlorous acid (HOCl) will react with the hydroxide ions ($OH^-$) produced at the cathode, like so:

$$HOCl+OH^-\rightarrow H_2O+OCl^-$$

Accordingly, the overall reaction can be written like so:

$$NaCl+H_2O\rightarrow NaOCl+H_2$$

The cell 2 will also comprise a vent comprising a metal catalyst (not shown), such as palladium or platinum. The vent is configured to vent the hydrogen produced in the reaction from the electrolysis compartment 4 and through the metal catalyst, thereby causing the hydrogen to be converted into water. The vent is configured to then discharge the water into the surrounding environment.

By controlling the current and the time for which it is applied, the control system is able to control the amount of sodium hypochlorite (NaOCl) that is produced. Some typical values for the cell 2 are given in Table 1, below.

TABLE 1

| Relationship between different changeable parameters | |
| --- | --- |
| Electric power | AC transform, 100-200 V |
| Potential | 5 V |
| Power | 240 W |
| Electroactive area | 0.02 m$^2$ |
| Electrode gap | 0.01 m |
| Dwell time | 120 s |
| Volume per flush | 6 L |
| NaOCl concentration delivered per flush | 539 ppm |

When the toilet 20 is flushed, the water level in the toilet cistern 18 is lowered causing the pressure downstream of the diaphragm check valve 22 disposed in the base of the electrolysis compartment 4 to be lower than the pressure upstream of the valve 22. Accordingly, the check valve 22 will open and the solution comprising the sodium hypochlorite will flow through the check valve 22, through the cistern 18 and into a toilet bowl 24, thereby causing the bowl 24 to be cleaned.

Depending on the flow of the liquid through the first electrode 12, some of the saturated sodium chloride solution will also flow out of the reservoir 6, into the electrolysis compartment 4, through the cistern 18 and into a toilet bowl 24.

The water in the cistern 18 will then be replaced. Once the water level rises above the level of the check valve 22, the pressure downstream of the check valve 22 will be greater than or equal to the pressure upstream of the check valve 22. Accordingly, this will prevent any further liquid from flowing out of the electrolysis compartment 4.

Once the water rises to the water fill level 17, water will begin to flow into the reservoir 6. As mentioned above, the NaCl 11 disposed in the reservoir 6 will dissolve in the water and the sodium chloride solution will flow into the electrolysis compartment 4 and the cell 2 may perform a further electrochemical reaction, as described above.

It is noted that once the reservoir 6 is filled with water some of the NaCl ions in the water may diffuse into the cistern 18. However, since the water will be static the diffusion process will be slow, and minimal amounts of the salt will be lost to the cistern 18.

Example 2—Continuous Production of Ammonium Persulfate ((NH$_4$)$_2$S$_2$O$_8$)

An alternative embodiment of the invention is shown in FIG. 3. Similar to the embodiment described above, the electrochemical cell 2' comprises an electrolysis compartment 4 adjacent to a reservoir 6 and the connecting wall there between comprises an anode 12. In this embodiment, the reservoir 6 comprises a removable lid 10, allowing a user access to the reservoir 6.

The main difference is that, in the embodiment illustrated, the electrolysis compartment 4 comprises an ion-permeable membrane 28, comprising Nafion®, separating the anode 12 and cathode 14, and thereby dividing the compartment 4 into an anolyte compartment 30 and a separate catholyte compartment 32. The membrane 28 prevents the oxidant produced at the anode from being subsequently reduced at the cathode.

Furthermore, the anode 12 comprises boron doped diamond and the cathode comprises stainless steel. Instead of adding sodium chloride (NaCl) to the reservoir, a user instead adds ammonium bisulfate ((NH$_4$)HSO$_4$) 33 to the reservoir 6. Finally, the valve in the base of the cell 2' is a flow control valve 38 and water is continuously delivered into the reservoir 6 through an inlet (not shown).

The cell 2', shown in FIG. 3, is configured to allow continuous production of ammonium persulfate. Accordingly, the control system would monitor the conductivity across the electrolysis compartment 4. Using the continuous flow valve 38, the control system can control the rate that the water flows into the reservoir 6 and out of the electrolysis compartment 4. This ensures that the concentration of the oxidant in the water as it flows out of the electrolysis compartment 6 will be consistent. The power supply 26 would remain on continuously, causing the following reaction at the anode:

$$2HSO_4^- \rightarrow S_2O_8^{2-} + 2H^+ + 2e^-$$

And, the following reaction at the cathode:

$$2H^+ + 2e^- \rightarrow H_2$$

Accordingly, the overall reaction can be written like so:

$$2NaHSO_4 \rightarrow Na_2S_2O_8 + H_2$$

The hydrogen gas will be vented from the electrolysis compartment 4, as described in example 1.

Persulfate destroy certain organisms, such as biocides. Accordingly, the solution comprising the ammonium persulfate which is produced in using the cell 2 could be used to treat ballast water in ocean-going ships, as described in Ahn et al., "Disinfection of Ballast Water with Iron Activated Persulfate", Environ. Sci. Technol., 2013, 47 (20), pp 11717-11725.

Example 3—Batch Production of Hydrogen Peroxide (H$_2$O$_2$)

Figure 4:
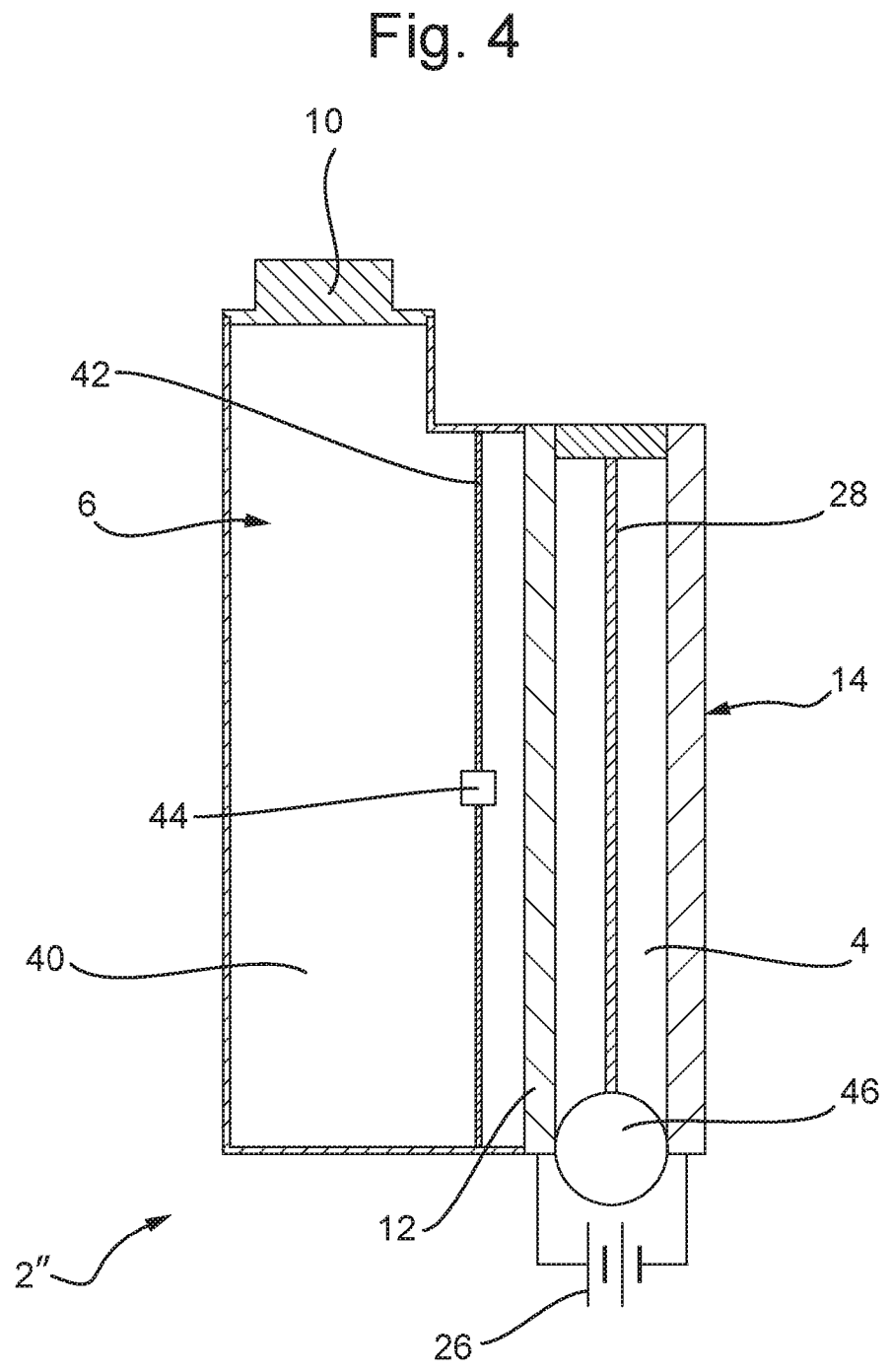

A further alternative embodiment of the invention is shown in FIG. 4. An electrochemical cell 2" is configured for use in a tap (not shown). The tap has two separate outlets, one to dispense drinking water and the other to dispense the oxidant produced by the cell 2". Accordingly, the oxidant could then be dispensed when required by the user to clean the area around the tap.

Similar to the embodiment described in example 2, the electrochemical cell 2" comprises an electrolysis compartment 4, a reservoir 6 and an anode 12 comprising a mesh. However, the cell 2" also comprises a dividing wall 42 disposed between the reservoir 6 and the anode 12. The dividing wall 42 comprises a solenoid valve 44 disposed therein.

Similar to the embodiment discussed in example 2, the electrolysis compartment 4 comprises an ion-permeable membrane 28, comprising Nafion®, separating the anode 12 and cathode 14. Furthermore, the anode 12 and cathode 14 comprise stainless steel. The valve in the base of the cell 2" is a further solenoid valve 46. To aid the reaction, a user could add a salt, such as sodium sulfate (Na$_2$SO$_4$), to the reservoir 6. The electrolysis compartment 4 will also comprise a gas inlet comprising a solenoid valve and a gas vent comprising a back-pressure regulating valve (not shown).

Instead of adding sodium chloride (NaCl) to the reservoir, a user instead adds water with O$_2$ pre-disposed 40 therein. Or in an alternative embodiment, the water with O$_2$ pre-disposed 40 therein could be introduced by an inlet into the reservoir. This liquid would flow through the anode 12 into the electrolysis compartment 4. In operation, the solenoid valves 46 in the base of the cell 2" and in the air inlet would be closed and the solenoid valve 44 in the dividing wall 42 would be open. Accordingly, the water with O$_2$ pre-disposed

40 therein would flow into the electrolysis compartment 4 and any gas disposed therein would flow out of the vent. The control system would monitor the level of the liquid in the electrolysis compartment 4, and would activate the power supply 26 once a desired level had been reached.

The following reaction would occur at the cathode:

$$O_2+H_2O+2e^-\rightarrow HO_2^-+OH^-$$

And the following reaction would occur at the anode:

$$HO_2^-+H_2O\rightarrow H_2O_2+OH^-$$

Accordingly, the overall reaction can be written as:

$$O_2+2H_2O+2e^-\rightarrow H_2O_2+2OH^-$$

The following unwanted side reactions may occur:

$$O_2+2H_2O+4e^-\rightarrow 4OH^- \quad\quad 1)$$

$$2H_2O+2e^-\rightarrow H_2+2OH^- \quad\quad 2)$$

If the second side reaction is suppressed no hydrogen gas is produced.

When the user requires a cleaning solution, they may turn the tap on and the control system will open the solenoid valves 46 in the base of the cell 2" and in the air inlet and close the solenoid valve 44 in the dividing wall 42. Accordingly, this would cause the solution comprising the hydrogen peroxide to flow out of the electrolysis compartment 4 and out of the tap. Since the reservoir 6 has been isolated from the electrolysis compartment, the water with $O_2$ pre-disposed therein would remain in the reservoir and could be used in future electrolysis reactions, as described above.

Example 4—Evaluation of Mesh Size on Permeation Rates

Figure 5:
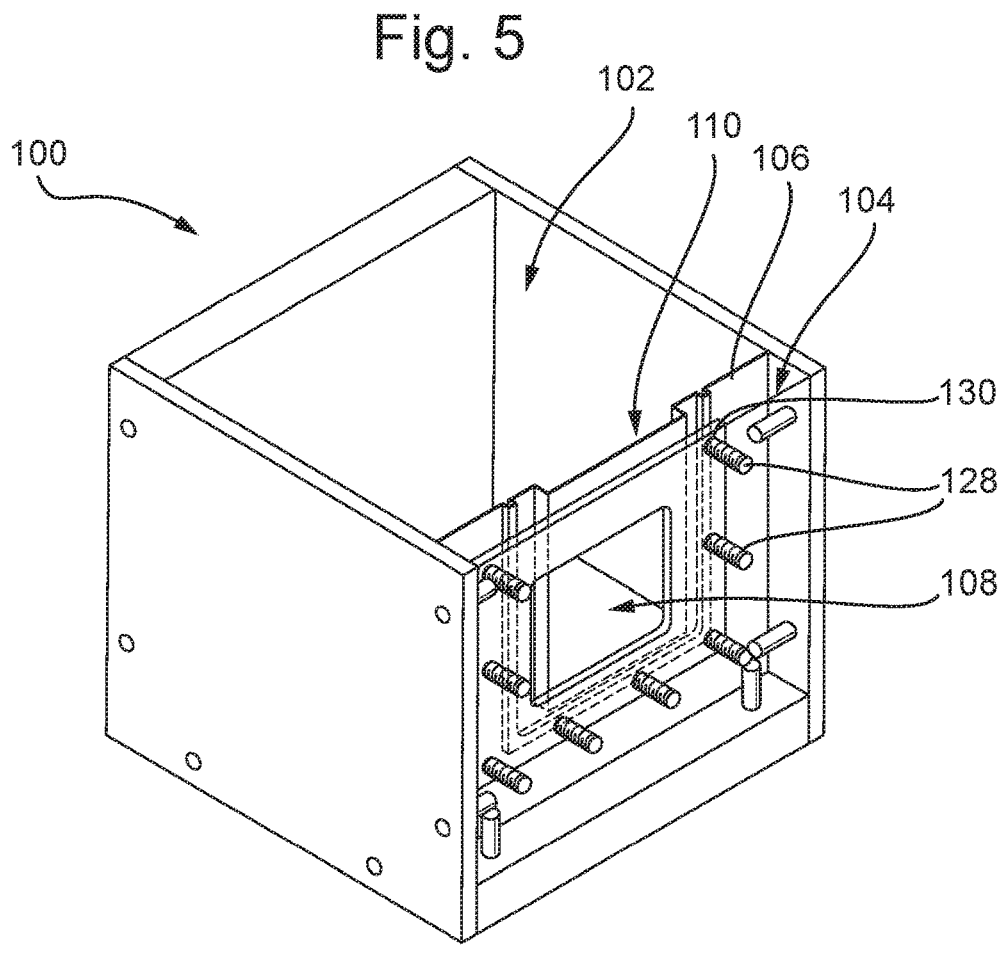
FIG. 5 is a diagram of a reaction cell.

To determine permeation rates, a reaction cell 100, shown in FIG. 5, was built. The cell 100 was made from Perspex acrylic to make it light and enable visibility to the inside. The cell 100 comprises two compartments, a water feeding chamber 102 and a reaction chamber 104, separated by an acrylic wall 106. The total operational volume of the cell 100 is 900 mL, with the reaction chamber 104 comprising 10 mL and the water feeding chamber 102 comprising 890 mL.

The acrylic wall 106 comprises an aperture 108 allowing a fluid to pass between the water feeding chamber 102 and the reaction chamber 104. A slot 110 in the wall 106 allows a mesh holder 112 to be reversibly located in the slot 110.

Figure 6:
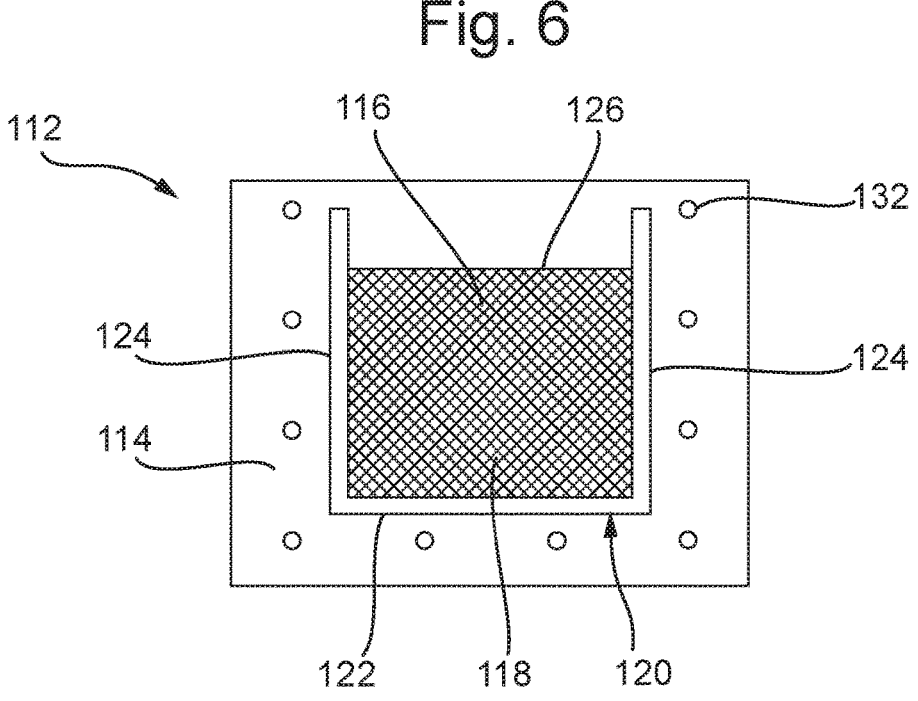
FIG. 6 is a diagram of a mesh holder for use with the reaction cell of FIG. 5.

An example mesh holder 112 is shown in FIG. 6, and comprises an acrylic frame 114 defining an aperture 116 therein. The size of the aperture 116 in the acrylic frame 114 corresponds to the size of the aperture 108 in the wall 106. A mesh 118 extends across the aperture 116 and was fixed using silicone to prevent water passing through the gap between the mesh and the acrylic. A rubber seal 120 is disposed around the bottom 122 and sides 124 of the aperture 116 to provide a seal with the wall 106 when the mesh holder 112 is disposed in the slot 110. The inventors designed the experiments so that the water level would not reach the top of the aperture 116, and so no seal was provided along the top edge 126 thereof.

When the mesh holder 112 is disposed in the slot 110 it is fixed in place with screws 128 which extend through threaded holes 130 in the wall 106 and corresponding threaded holes in the acrylic frame 114 of the mesh holder 112.

The reaction chamber 104 was graded at different volumes to determine the liquid flow passing through the mesh 118 using a hand-held timer.

To measure the permeation rate across the mesh a threaded valve (not shown) was fitted to drain the contents of the reaction chamber 104. The internal diameter of the threaded valve is 1.5 cm and the flow rate allows the electrochemical chamber to drain in approximately 3 s. The valve is 10 cm in length and the tap is centred along the body of the valve.

The inventors obtained stainless steel mesh of different aperture sizes from meshdirect.co.uk. Details on the mesh sizes and characteristics are detailed in Table 2.

TABLE 2

| Stainless steel plain weave mesh description | |
|---|---|
| Product Code | Description |
| Mesh 150 | 0.1 mm aperture |
| Mesh 300 | 0.055 mm aperture |
| Mesh 500 | 0.026 mm aperture |

The meshed were placed in mesh holders 112 as described above.

In turn, each mesh holder was placed in the reaction cell and affixed to the reaction chamber against the rubber U-seal 120. The reaction cell was filled with 900 mL of deionised water. The valve was then opened for 5 seconds to allow the reaction chamber to drain and the time taken to refill was recorded.

None of the woven meshes tested above was found to restrict water flow to any significant degree—permeation from the reservoir to the electrolytic chamber was instantaneous. This is non-ideal for the development of a toilet device, as this will incur significant salt loss per flush.

The permeation rate can be restricted by one of two methods: (i) changing the type of mesh from a plain weave to an alternate style, e.g. Dutch twilled weave, which can further reduce the aperture (to 6 µm); or (ii) increase the tortuosity of the porous electrode by using stainless steel plates.

The second of these options (sintered stainless steel plates) were adopted in this work due to their positive attributes, including physical robustness, large surface area and the availability of media grades, offering a range of pore sizes and tortuosity.

A sample pack of sintered stainless steel plates was obtained from Mott corp., and the characteristics of the plates are provided in table 3.

TABLE 3

| Sintered stainless steel (SS316) plates evaluated in this work. | |
|---|---|
| Media grade | Thickness (mm) |
| 100 | 2.6 |
| 50 | 2.1 |
| 20, 10, 5, 2 | 1.6 |
| 0.5 | 1.2 |
| 0.2 | 1.1 |

Sintered metal media are manufactured by pressing metal powder into porous sheets or tubes, followed by high-temperature sintering. The powder size, as well as the pressing and sintering conditions, determines the pore size and distribution, strength and permeability of the sintered material which is produced. The media grade designation is equivalent to the mean flow pore (MFP) of the filter. Accordingly, a filter with a media grade of 20 has a MFP of 20 µm.

Figure 13:
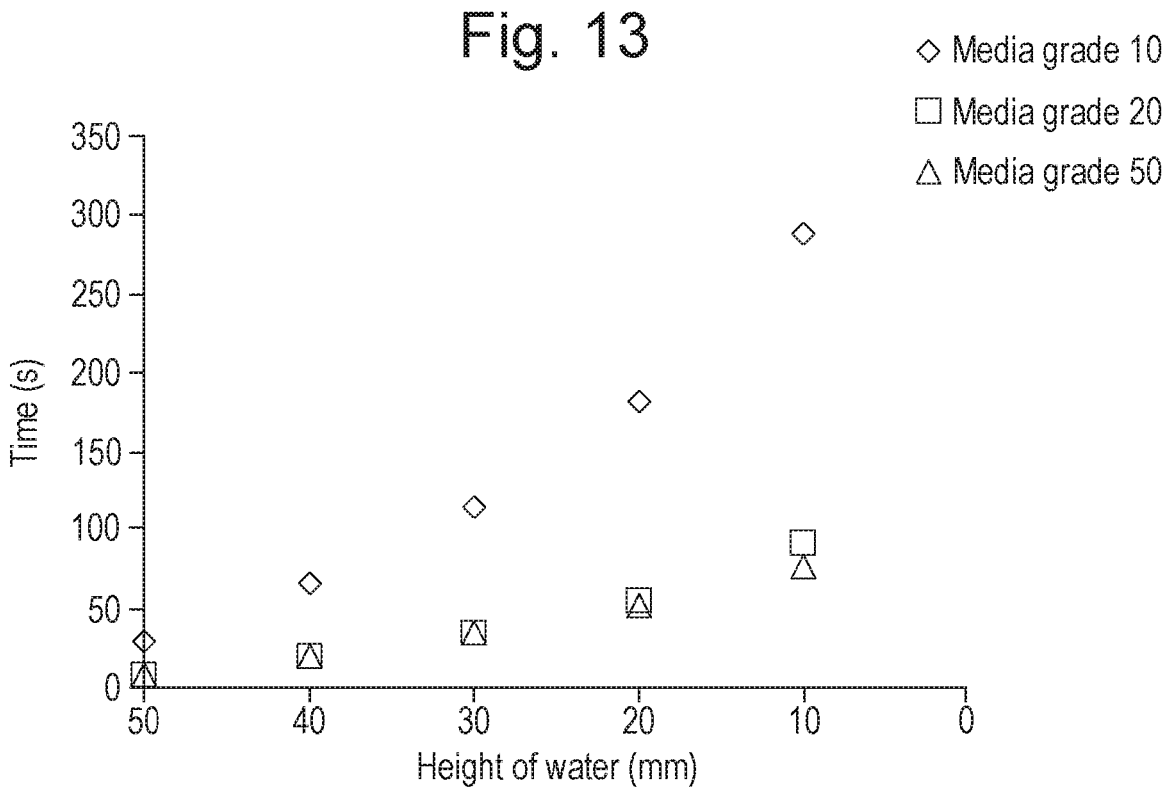
FIG. 13 shows a graph of rates of filtration through sintered metal disks of different media grades under gravity.

FIG. 13 shows the height of a column of water above sintered discs of media grade 10, 20 and 50 over time. As would be expected, a sintered disc of media grade 10 is much less permeable than discs with a media grade of 20 or 50.

Based on their experiments, the inventors found that the stainless steel plate of media grade 20, with a thickness of 2 mm, offered a refill time of about 2 min. It will be appreciated that the refill time can be modified by changing the thickness and/or media grade of the plate.

Example 5—Evaluation of Concentration Evolution in Electrode Gap

The apparatus described in example 4 was also used for this experiment. To enable the conductivity to be measured, a conductivity meter probe (not shown) was placed extending into the reaction chamber. The conductivity probe was calibrated using aqueous NaCl solutions between 1-100,000 ppm. Measurements were made at four different temperatures (8, 12, 22 and 35° C.), and the results are shown in FIG. 7.

As expected, a monomial relationship between conductivity and salt concentration was found:

$$\text{Salt concentration} = (3.94 \times 10^{-3} \times \text{Conductivity})^{1.090}$$

Figure 7:
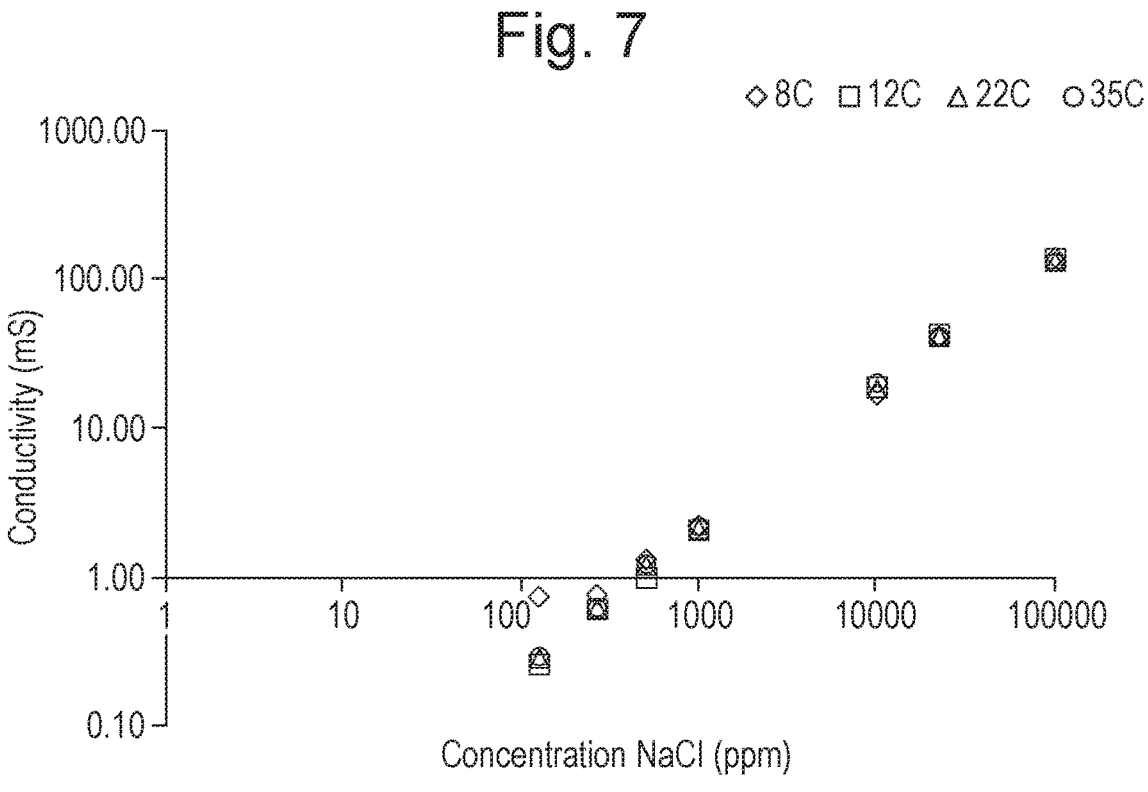
FIG. 7 is a graph showing the relationship between sodium chloride (NaCl) concentration and conductivity.

As shown in FIG. 7, no relationship between conductivity and temperature was found at the temperatures and concentrations measured.

While NaCl dissolves very quickly in water to form a saturated solution, the diffusion of the resulting brine solution through the bulk of the solution proves to be very slow. This can be established by two preliminary experiments.

Figure 8:
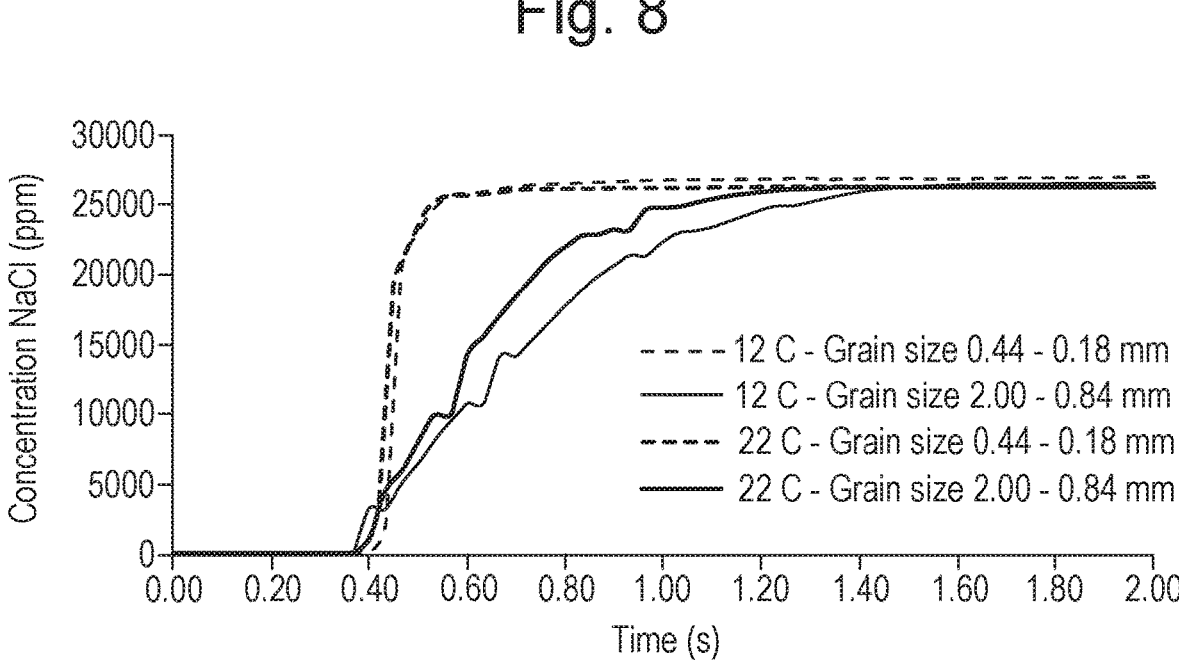
FIG. 8 is a graph showing the rate of NaCl dissolution of different particle sizes and temperatures.

The first set of experiments measured the dissolution of 20 g of NaCl, added to a 900 mL of water with agitation (magnetic stirring at 850 RPM). Dissolution of the salt was found to be dependent on the particle size and temperature of the water, see FIG. 8.

Figure 9:
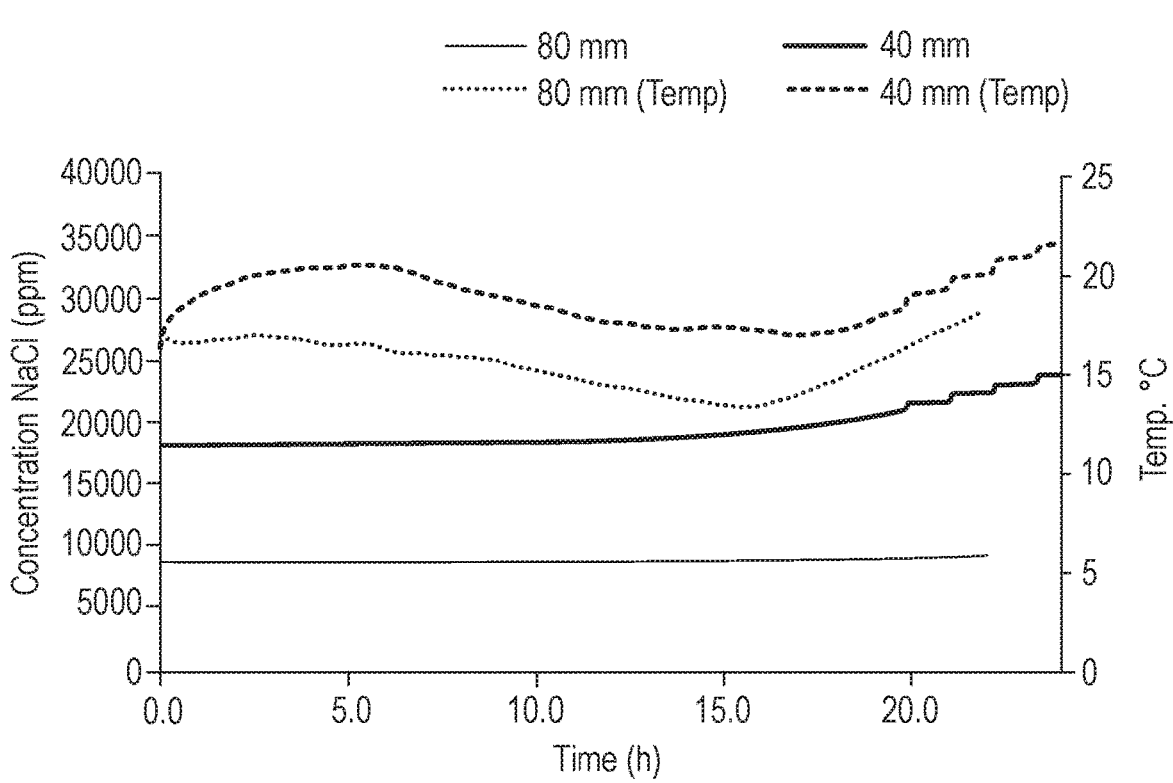
FIG. 9 is a graph showing the concentration of salt solution in a static solution with the conductivity probe held 40 (blue) and 80 (red) mm above the bottom of the tank, the dotted lines show the temperature of the solution against time.
Figure 10:
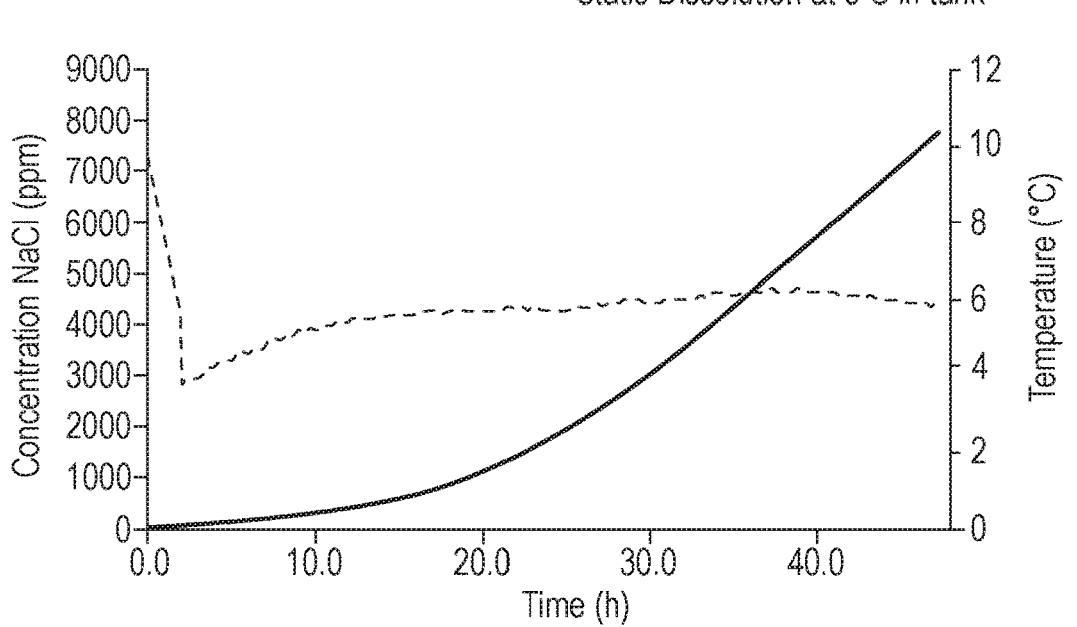
FIG. 10 is a graph showing the static dissolution of NaCl in water with the probe held 40 mm above the bottom of the tank, the dotted line shows the temperature of the solution against time.

In contrast, the addition of 900 mL of waster to 20 g of NaCl in the same tank without agitation showed that diffusion of the salt solution is very slow, see FIG. 9. While the salt dissolves within several hours, the diffusion of the saline solution through the bulk liquid took days. This was further exacerbated by lowered temperature, see FIG. 10.

Figure 11:
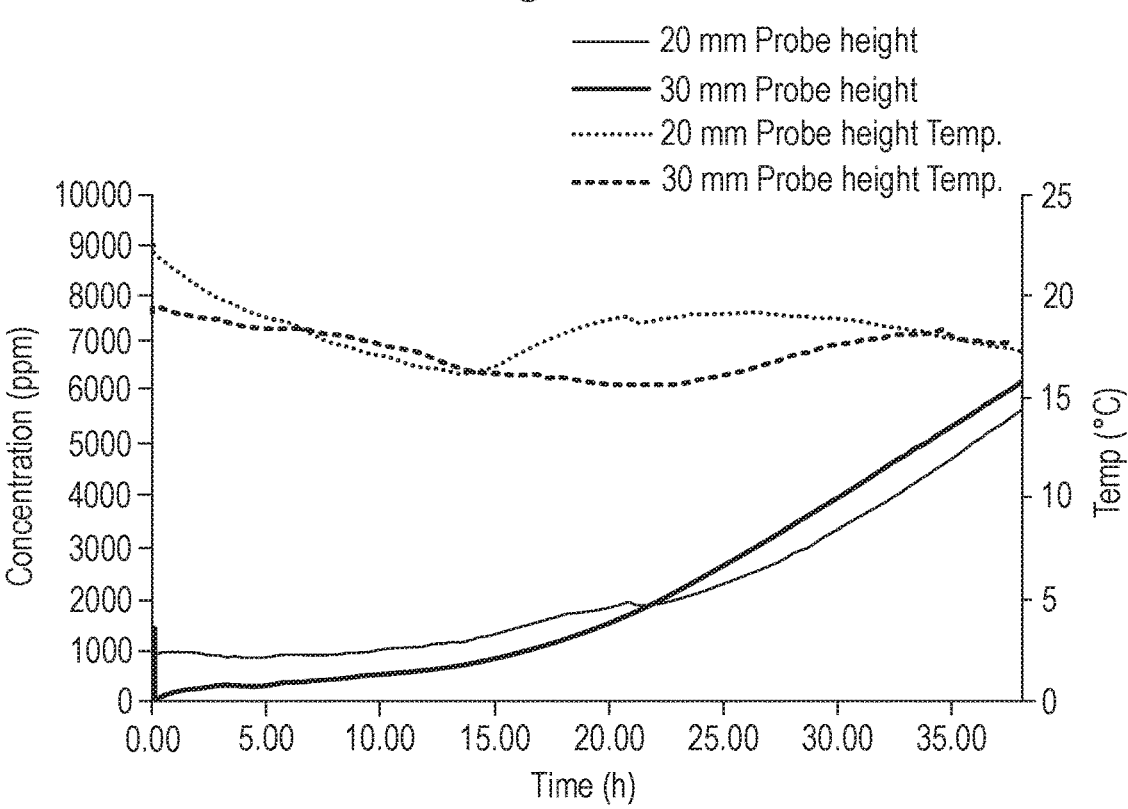
FIG. 11 is a graph showing the concentration of salt solution in a static solution, with the conductivity probe held 20 (blue) and 30 (red) mm above the bottom of a column.

To determine the length of time required for the saturated brine solution to form and then diffuse the dissolution experiment was repeated using a static column. 1 g of NaCl was added to a measuring cylinder followed by the addition of 5 mL saturated brine solution, the measuring cylinder was carefully filled to 40 mL with deionised water. The conductivity was measured at heights of 20 mm and 30 mm for 2 days The complete dissolution of the salt took less than 12 hours, it took over 24 hours for the diffusion of the saline solution through the static column to reach its peak flux, see FIG. 11.

Figure 12A:
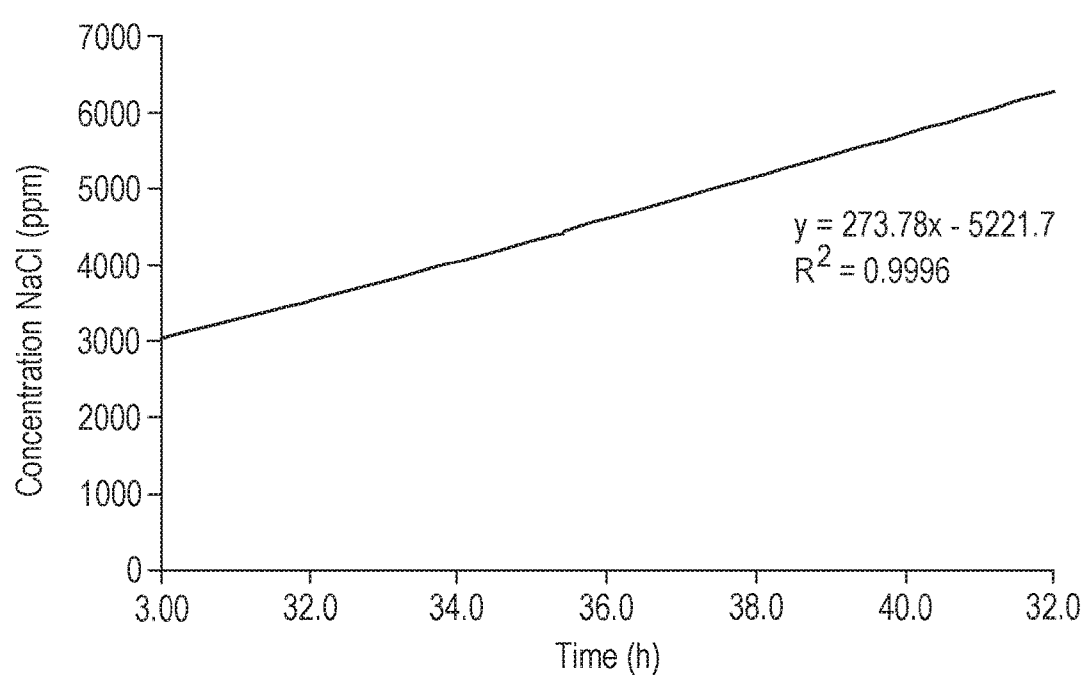
FIG. 12 shows graphs of the gradient of saline diffusion through a static tank (A) and a column (B)
Figure 12B:
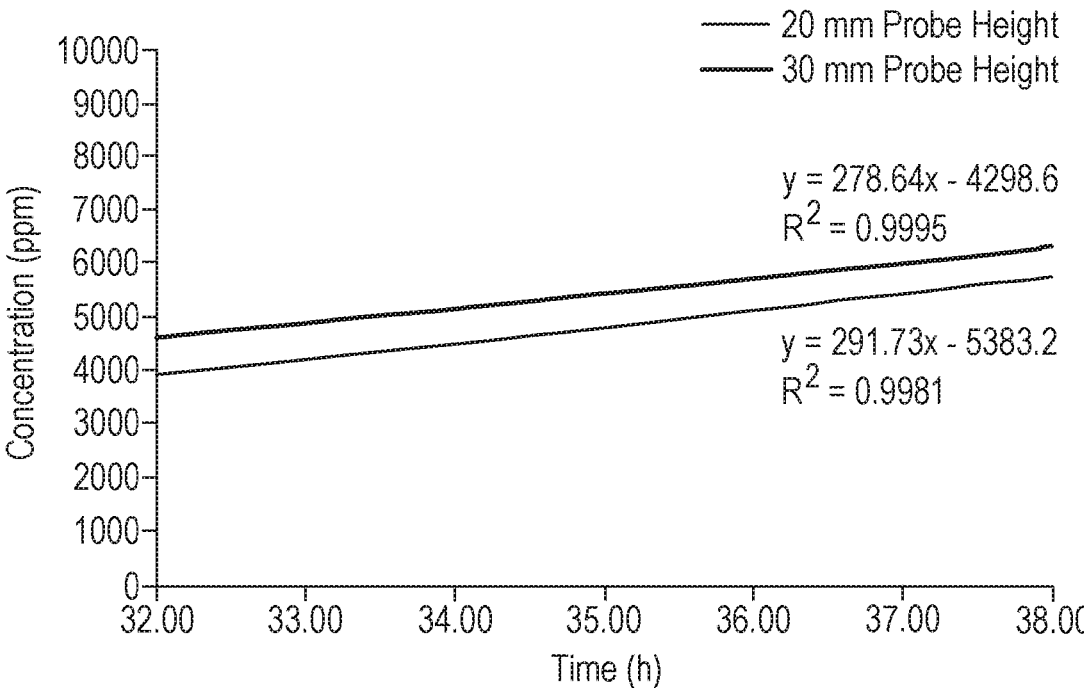

Comparing the rate of diffusion of the saline solution through both the static tank and static column (FIG. 12) reveals that the rate is independent of both size of vessel and height. The independence of the rate of change in concentration to both salt concentration and volume of liquid supports our observation that the dissolution of salt (into even near saturated solutions) is much faster than the passive diffusion of saline.

Accordingly, the inventors suggest that the apparatus of the invention comprises some form of agitation means configured to agitate the fluid therein. For instance, a stirrer could be disposed in the water feeding chamber.

Figure 14A:
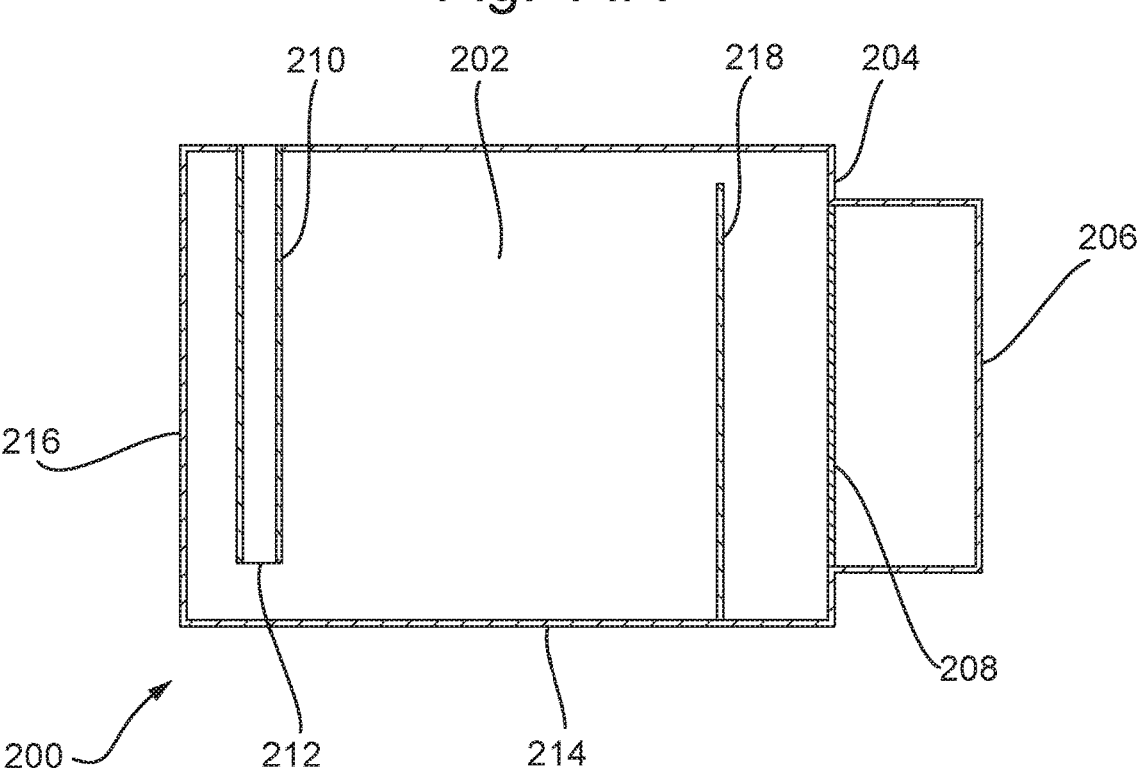
FIG. 14 shows further embodiments of an electrochemical cell.

An alternative solution is shown in FIG. 14. The apparatus 200 shown in FIG. 14A comprises a reservoir 202. On a first side 204 of the reservoir 202 is an electrolysis compartment 206. The connecting wall between the reservoir 202 and the electrolysis compartment 206 comprises a porous anode 208.

A conduit 210, configured to carry water, extends into the reservoir 202 and terminates at an outlet 212 substantially adjacent to a base 214 and a second side of the reservoir 202, wherein the second side of the reservoir 202 is opposite the first side 204. The reservoir 202 further comprises a weir 218 substantially adjacent to the first side 204 of the reservoir 202. The weir 218 extends between the base 214 and the back and the front of the reservoir 202. Accordingly, water flowing from the outlet 212 will flow through salt disposed on the base 214 of the reservoir 202 and will then have to flow up and over the weir 218. This will cause mixing of the fluid within the reservoir 202 leading to better diffusion of the salt solution.

The inventors noted that the reaction chamber filled from the top of the sintered stainless steel plate. Additionally, the plate did not restrict the passive diffusion of solution between the weir and reaction chamber when left overnight. Based on these observations, the inventors recommend that a double weir or stepped weir is used for the prototype design.

Figure 14B:
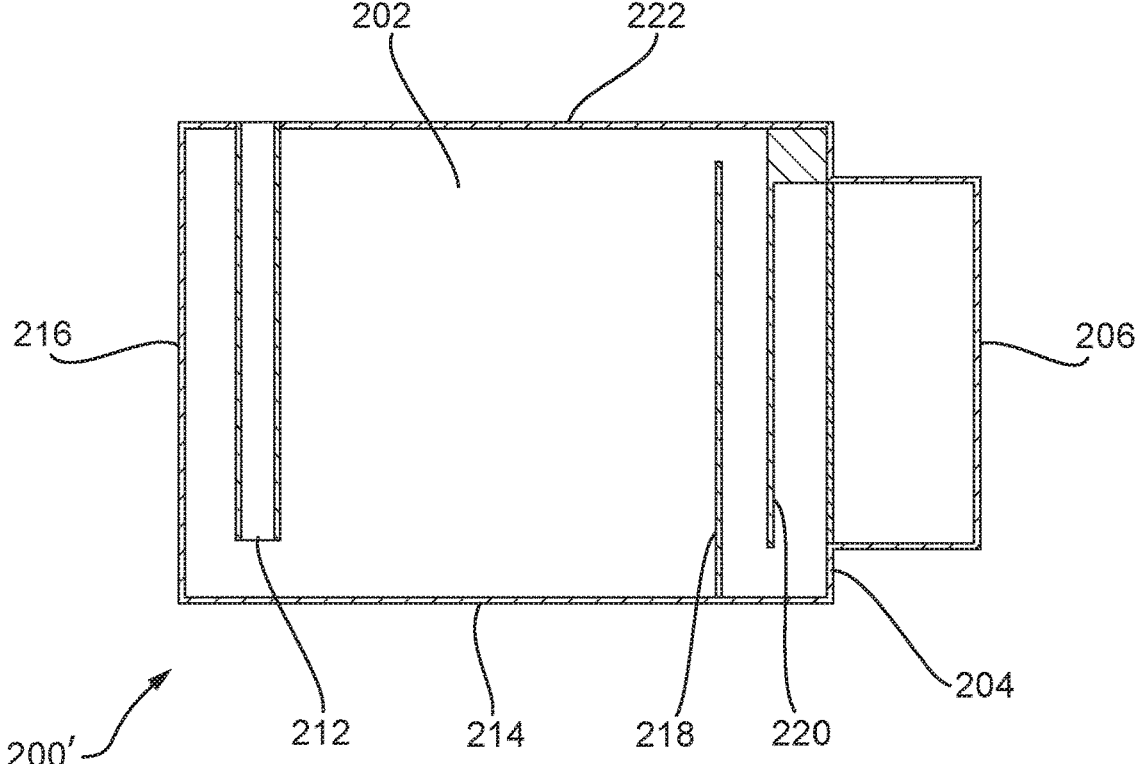

A double weir arrangement is shown in FIG. 14B. The apparatus 200' shown in this Figure is identical to the embodiment shown in FIG. 14A except that the reservoir 202 further comprises a second weir 220 disposed between the first side 204 of the reservoir 202 and the first weir 218. The second weir 220 extends from a top 222 of the reservoir 202. Accordingly, water flowing from the outlet 212 will flow through salt disposed on the base 214 of the reservoir 202 and will then have to flow up and over the first weir 218 and down and under the second weir 220.

Figure 14C:
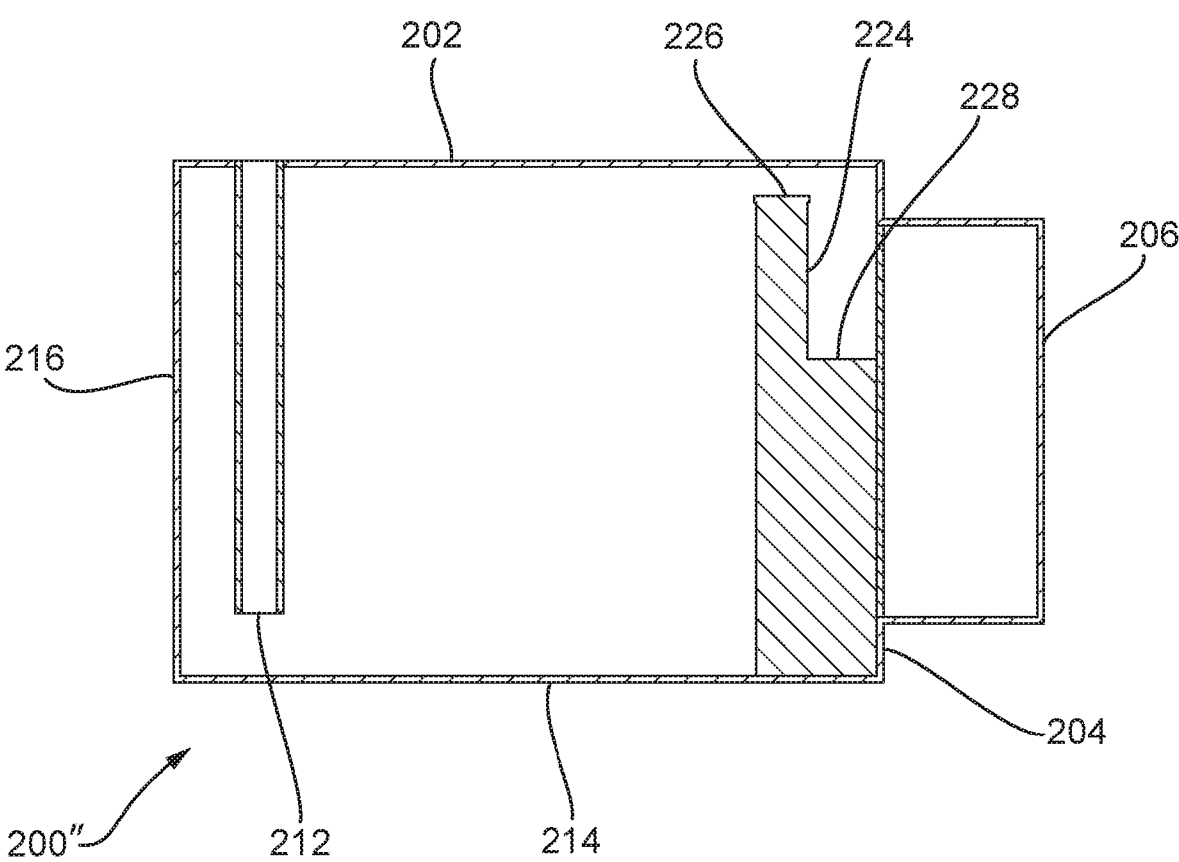

A stepped weir arrangement is shown in FIG. 14C. The apparatus 200" shown in this Figure is identical to the embodiment shown in FIG. 14A except a stepped weir 224 is disposed adjacent the first side 204 of the reservoir 202. The stepped weir 224 extends from the base 214 of the reservoir 202 and comprises a first step 226 and a second step. The first step 226 terminates spaced apart from but substantially adjacent to the top 222 of the reservoir 202. A second step 228 is disposed between the first step 226 and the first side 204, and terminates at a greater distance from the top of the reservoir than the first step. Accordingly, the second step 228 allows the water to flow to the porous anode 208, but prevents it from flowing to the base 214 of the reservoir 202.

Example 6—Further Applications

In addition to the examples given above, it will be appreciated that an electrochemical cell in accordance with the present invention may be used in a number of different applications. Some non-limiting examples are discussed below.

1. A small electrochemical cell 2 could be provided in a toothbrush and be battery powered. The oxidant could be generated after the toothbrush is used, preventing the build-up of bacteria on the toothbrush. Accordingly, in this application, the cell would batch produce the oxidant, which could be hydrogen peroxide or oxygen.

2. An electrochemical cell 2 could be configured for use in a hand sanitiser. Accordingly, when a user presses a button, the cell could be configured to release a dose of the liquid containing the oxidant allowing the user to clean their hands. In this application, the cell would produce the oxidant in a batch or semi-batch manner, and the oxidant could be hydrogen peroxide or bleach.

Figure 1B:
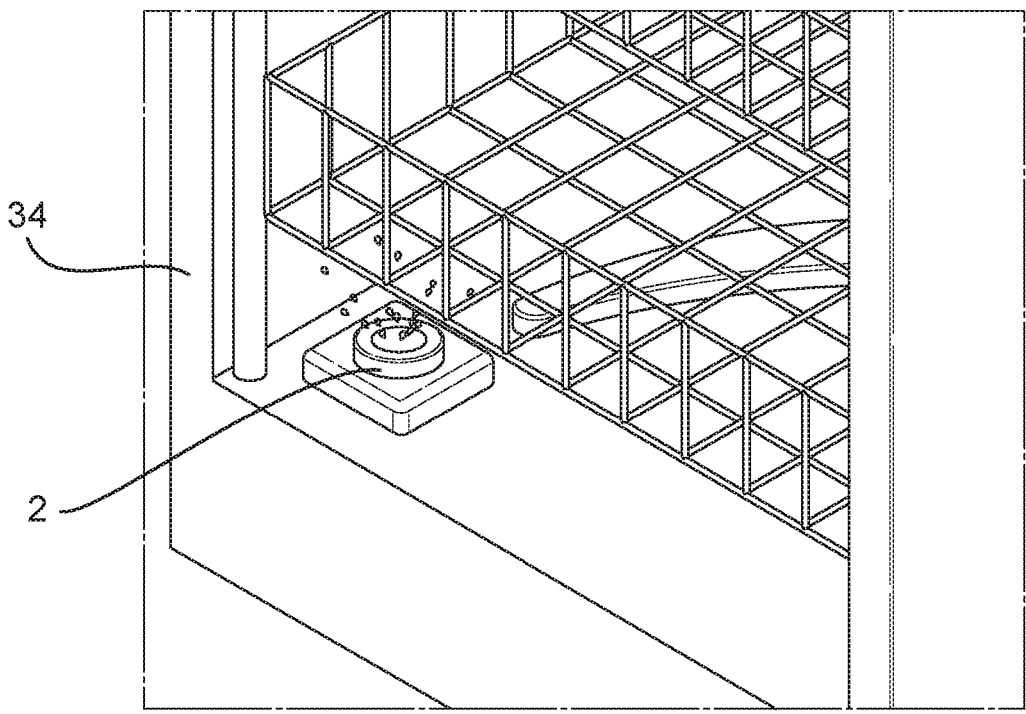
Figure 1C:
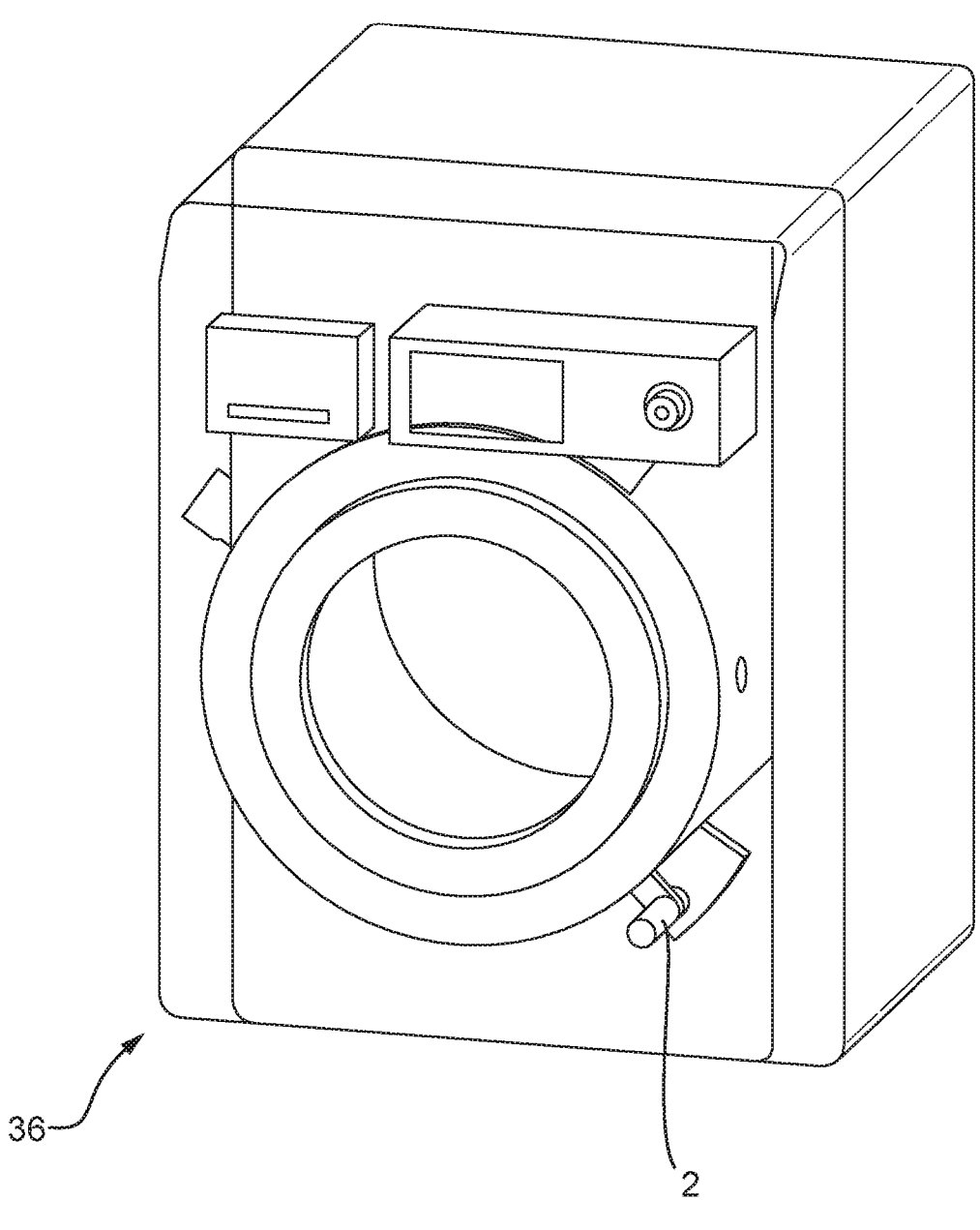

3. An electrochemical cell 2 may be configured for use in a dish washer 34 or washing machine 36, as shown in FIGS. 1*b* and 1*c*. Accordingly, the electrochemical cell 2 could dispense the oxidant during the wash cycle. Depending upon the wash cycle, the oxidant could either be produced in a batch, a semi-batch or a continuous manner. The oxidant could be hydrogen peroxide or a percarbonate.

4. An electrochemical cell 2 may be configured to dispense the oxidant directly into a swimming pool, and to thereby purify the water. Accordingly, the oxidant could either be produced in a batch or a semi-batch manner, and added to the pool water as required. The oxidant could be hydrogen peroxide or a percarbonate.

5. Finally, similar to example 2, an electrochemical cell 2 could be disposed on an ocean liner. The oxidant could be released from the hull of the liner to dislodge barnacles therefrom and/or to prevent them from becoming attached thereto. For this application, the oxidant could either be produced in a batch, a semi-batch or a continuous manner. The oxidant could be persulfate or bleach.

CONCLUSIONS

The electrochemical cells described above manufacture oxidants in situ. Accordingly, there is no need to store oxidants prior to use. The cells comprise control systems which carefully control the concentration of oxidants produced, ensuring that there is enough for the desired purpose, and little is wasted or left to contaminant the environment. Furthermore, since the oxidants may be applied automatically, the risk of human exposure to the oxidants is greatly reduced.

Since a salt may be added directly to the electrochemical cells, there is no need for salt solutions to either be stored in the vicinity of the electrochemical cell, or prepared by a user prior to being added to the cell.

Delivery of the oxidant may be controlled in a number of ways including:

1. Electronic active control—where a pump may be used to pump a liquid containing the oxidant out of the electrolysis cell 2;

2. Electronic passive control—where solenoid valves in an inlet and/or outlet may be used to control the flow of a liquid containing the oxidant from the electrolysis cell 2;

3. Mechanical active control—where valves in an inlet and/or outlet are configured to open automatically when the pressure downstream of the valve is greater than the pressure upstream of the valve and thereby control the flow of a liquid containing the oxidant from the electrolysis cell 2; and/or 4. Mechanical passive control—where the reservoir 6 is open and the cell is positioned to allow water to flow therein in a controlled manner.

It will be appreciated that these control methods may be used in combination with each other.

The invention claimed is:

1. A method of producing an oxidant, the method comprising:

(a) charging an electrochemical reactant reservoir with an electrochemical reactant, wherein the electrochemical reactant is a solid salt;

(b) disposing water from an external source directly in the electrochemical reactant reservoir and dissolving a portion of the solid electrochemical reactant in water to create an electrolyte;

(c) passing the electrolyte, from the electrochemical reactant reservoir, through a porous first electrode and into an electrolysis compartment comprising a gas, and thereby displacing the gas from the electrolysis compartment, wherein the porous first electrode comprises a sintered metal having a mean flow pore (MFP) of between 0.1 and 100 μm and the porous first electrode defines a boundary between the electrochemical reactant reservoir and the electrolysis compartment and thereby holds undissolved solid electrochemical reactant in the electrochemical reactant reservoir and prevents it from passing into the electrolysis compartment;

(d) sensing the conductivity or resistance between the porous first electrode and a second spaced apart electrode, wherein the second electrode is disposed at least substantially in the electrolysis compartment;

(e) applying a voltage across the porous first electrode and a second spaced apart electrode and causing a current to flow through the porous first electrode and second electrode and the electrolyte, thereby driving an electrochemical reaction and producing the oxidant, wherein the oxidant is dissolved in a liquid in the electrolysis compartment;

(f) causing the liquid comprising the oxidant to flow out of the electrolysis compartment and a gas to flow into the electrolysis compartment to displace the liquid;

(g) passing further electrolyte from the electrochemical reactant reservoir, through the porous first electrode and into the electrolysis compartment, and thereby displacing the gas from the electrolysis compartment and refilling the electrolysis compartment with the electrolyte; and (h) repeating steps (d) through (g) without recharging the electrochemical reactant reservoir with further electrochemical reactant.

2. A method according to claim 1, wherein the electrochemical reactant comprises an inorganic salt, optionally wherein the salt is a chloride, a sulfate, a carbonate, a phosphate or a hydroxide; and a sodium salt, a potassium salt or an ammonium salt.

3. A method according to claim 1, wherein the method comprises:

applying the voltage across the porous first electrode and the second electrode for a predetermined time when a desired conductivity or resistance is sensed; and then causing an electrolyte to flow from the electrolysis compartment for a predetermined time.

4. The method according to claim 1, wherein the method produces the oxidant in a batch or semi-batch electrochemical reaction.

5. The method according to claim 1, wherein the method comprises causing further water from the external source to flow directly into the electrochemical reactant reservoir without recharging the electrochemical reactant reservoir with further electrochemical reactant.

6. A method of producing an oxidant, the method comprising:

a) charging an electrochemical reactant reservoir with an electrochemical reactant, wherein the electrochemical reactant is a solid salt;

b) disposing water from an external source directly in the electrochemical reactant reservoir and dissolving a portion of the solid electrochemical reactant in the water to create an electrolyte;

c) passing the electrolyte from the electrochemical reactant reservoir, through a porous first electrode and into an electrolysis compartment comprising a gas, and thereby displacing the gas from the electrolysis compartment, wherein the porous first electrode a mesh having a pore size of between 0.01 μm and 1,000 μm and the porous first electrode defines a boundary between the electrochemical reactant reservoir and the electrolysis compartment and thereby holds undissolved solid electrochemical reactant in the electrochemical reactant reservoir and prevents it from passing into the electrolysis compartment;

d) sensing the conductivity or resistance between the porous first electrode and a second spaced apart electrode, wherein the second electrode is disposed at least substantially in the electrolysis compartment;

e) applying a voltage across the porous first electrode and the second spaced apart electrode for a predetermined time when a desired conductivity or resistance is sensed and causing a current to flow through the porous first electrode and the second electrode and the electrolyte, thereby driving an electrochemical reaction and producing the oxidant, wherein the oxidant is dissolved in a liquid in the electrolysis compartment;

f) causing the liquid comprising the oxidant to flow out of the electrolysis compartment and a gas to flow into the electrolysis compartment to displace the liquid;

g) passing further electrolyte from the electrochemical reactant reservoir, through the porous first electrode and into the electrolysis compartment, and thereby displacing the gas from the electrolysis compartment and refilling the electrolysis compartment with the electrolyte; and h) repeating steps (d) through (g) without recharging the electrochemical reactant reservoir with further electrochemical reactant.

* * * * *